(12) United States Patent
Rokkan et al.

(10) Patent No.: US 10,712,465 B2
(45) Date of Patent: Jul. 14, 2020

(54) SYSTEM FOR AUTOMATICALLY ATTACHING AND DETACHING SEISMIC NODES DIRECTLY TO A DEPLOYMENT CABLE

(71) Applicant: Seabed Geosolutions B.V., Leidschendam (NL)

(72) Inventors: Arne Henning Rokkan, Olsvik (NO); Richard Edward Henman, Horsham (GB); Leif Johan Larsen, Alversund (NO); Johan Fredrik Næs, Trondheim (NO); Mariann Ervik, Trondheim (NO); Ole-Fredrik Semb, Tolvsrød (NO)

(73) Assignee: SEABED GEOSOLUTIONS B.V.

( * ) Notice: Subject to any disclaimer, the term of this patent is extended or adjusted under 35 U.S.C. 154(b) by 394 days.

(21) Appl. No.: 15/837,599

(22) Filed: Dec. 11, 2017

(65) Prior Publication Data
US 2018/0100940 A1     Apr. 12, 2018

Related U.S. Application Data

(63) Continuation of application No. 15/366,325, filed on Dec. 1, 2016, now Pat. No. 9,846,250, which is a
(Continued)

(51) Int. Cl.
*H02G 1/00* (2006.01)
*G01V 1/38* (2006.01)
(Continued)

(52) U.S. Cl.
CPC ............ *G01V 1/3852* (2013.01); *B65G 67/60* (2013.01); *F16L 1/14* (2013.01); *F16L 1/20* (2013.01); *F16L 1/235* (2013.01); *G01V 1/3843* (2013.01)

(58) Field of Classification Search
CPC ............ H02G 1/086; H02G 1/10; G01V 1/38; G01V 1/18; G01V 1/20
See application file for complete search history.

(56) References Cited

U.S. PATENT DOCUMENTS

| | | | |
|---|---|---|---|
| 4,313,392 A | 2/1982 | Guenther et al. | |
| 6,024,344 A | 2/2000 | Buckley | |

(Continued)

FOREIGN PATENT DOCUMENTS

| | | |
|---|---|---|
| CA | 2887400 A1 | 4/2006 |
| EP | 1870733 A3 | 9/2009 |

(Continued)

OTHER PUBLICATIONS

Cranford, A Direct-Recording Ocean-Bottom Seismograph, Bulletin of the Seismological Society of America, vol. 66, No. 2, 607-615 (Apr. 1976) ("Cranford").

(Continued)

*Primary Examiner* — Lee D Wilson

(57) ABSTRACT

Embodiments, including apparatuses, systems and methods, for automatically attaching and detaching seismic devices to a deployment cable, including a plurality of autonomous seismic nodes. A node installation system may include a moveable node carrier coupled to a cable detection device and a node attachment device that is configured to move a direct attachment mechanism on a node into a locking or closed position about the deployment cable. In an embodiment for retrieval and/or detachment operations, the system may also be configured to automatically detect the position of a node and remove the node from the deployment line by actuating the direct attachment mechanism into an open or unlocked position. Other devices besides a node may be attached and detached from the deployment line if they are coupled to one or more direct attachment mechanisms.

20 Claims, 19 Drawing Sheets

Related U.S. Application Data continuation of application No. 14/820,306, filed on Aug. 6, 2015, now Pat. No. 9,541,663.

(60) Provisional application No. 62/034,620, filed on Aug. 7, 2014.

(51) Int. Cl.
*B65G 67/60* (2006.01)
*F16L 1/14* (2006.01)
*F16L 1/20* (2006.01)
*F16L 1/235* (2006.01)

(56) References Cited

U.S. PATENT DOCUMENTS

| | | | |
|---|---|---|---|
| 6,044,786 | A | 4/2000 | Dudley |
| 6,657,921 | B1 | 12/2003 | Ambs |
| 6,951,138 | B1 | 10/2005 | Jones |
| 6,975,560 | B2 | 12/2005 | Berg |
| 7,254,093 | B2 | 8/2007 | Ray |
| 7,260,024 | B2 | 8/2007 | Goujon |
| 7,286,442 | B2 | 10/2007 | Fulshear |
| 7,310,287 | B2 | 12/2007 | Ray |
| 7,561,493 | B2 | 7/2009 | Ray |
| 7,602,667 | B2 | 10/2009 | Thompson |
| 7,646,670 | B2 | 1/2010 | Maxwell |
| 7,649,803 | B2 | 1/2010 | Thompson |
| 7,668,047 | B2 | 2/2010 | Ray |
| 7,724,607 | B2 | 5/2010 | Ray |
| 7,778,114 | B2 | 8/2010 | Goujon |
| 7,804,737 | B2 | 9/2010 | Thompson |
| 7,883,292 | B2 | 2/2011 | Thompson |
| 7,929,378 | B2 | 4/2011 | Gros |
| 7,933,165 | B2 | 4/2011 | Thompson |
| 7,986,589 | B2 | 7/2011 | Ray |
| 7,990,803 | B2 | 8/2011 | Ray |
| 8,021,080 | B2 | 9/2011 | Frivik |
| 8,050,140 | B2 | 11/2011 | Ray |
| 8,087,848 | B2 | 1/2012 | Thompson |
| 8,127,706 | B2 | 3/2012 | Thompson |
| 8,149,647 | B2 | 4/2012 | Borgen |
| 8,172,480 | B2 | 5/2012 | Thompson |
| 8,226,328 | B2 | 7/2012 | Thompson |
| 8,228,761 | B2 | 7/2012 | Ray |
| 8,328,467 | B2 | 12/2012 | Thompson |
| 8,427,900 | B2 | 4/2013 | Fleure |
| 8,619,495 | B2 | 12/2013 | Thompson |
| 8,675,446 | B2 | 3/2014 | Gateman |
| 8,801,328 | B2 | 8/2014 | Thompson |
| 8,864,416 | B2 | 10/2014 | Thompson |
| 8,879,362 | B2 | 11/2014 | Ray |
| 8,942,059 | B2 | 1/2015 | Furuhaug |
| 9,170,344 | B2 | 10/2015 | Lindberg |
| 9,541,663 | B2 * | 1/2017 | Rokkan ................ G01V 1/3843 |
| 9,829,589 | B2 | 11/2017 | Ray et al. |
| 9,846,250 | B2 * | 12/2017 | Rokkan ................ G01V 1/3843 |
| 2009/0324338 | A1 | 12/2009 | Thompson et al. |
| 2014/0198607 | A1 | 7/2014 | Etienne |
| 2015/0331126 | A1 | 11/2015 | Lambert et al. |
| 2016/0041284 | A1 * | 2/2016 | Rokkan ................ G01V 1/3843 29/428 |
| 2018/0100940 | A1 * | 4/2018 | Rokkan ................... F16L 1/14 |

FOREIGN PATENT DOCUMENTS

| | | |
|---|---|---|
| WO | 2005074426 A2 | 8/2005 |
| WO | 2006/041438 A1 | 4/2006 |
| WO | 2011/139159 A1 | 11/2011 |
| WO | 2014/027892 A1 | 2/2014 |
| WO | 2014/084741 A1 | 6/2014 |
| WO | 2014/185787 A1 | 11/2014 |

OTHER PUBLICATIONS

Mattaboni, MITOBs: A Seismometer System for Ocean-Bottom Earthquake Studies, Marine Geophysical Researches 3 (1977), pp. 87-102 ("Mattaboni").

http://www.carrack.co.uk/minidobs.htm ("Carrack"), Carrack Measurement Technology, downloaded Jun. 20, 2017.

Willoughby, A Microprocessor-Based Ocean-Bottom Seismometer, Bulletin of the Seismological Society of America, vol. 83, No. 1., 190-217 (Feb. 1993) ("Willoughby").

Prothero, First Noise and Teleseismic Recordings on a New Ocean Bottom Seismometer Capsule, Bulletin of the Seismological Society of America, vol. 74, No. 3., 1043-1058 (Jun. 1984) ("Prothero").

Johnson, A Free-Fall Direct-Recording Ocean Bottom Seismograph, Marine Geophysical Researches 3 103-117 (1977) ("Johnson").

Sutton, Optimum Design of Ocean Bottom Seismometers, Marine Geophysical Researches 9 (1987), pp. 47-65 ("Sutton").

Schmalfeldt, Explosion-Generated Seismic Interface Waves in Shallow Water: Experimental Results, SACLANTCEN Report SR-71 (1983) ("Schmalfeldt").

Eguchi, a real-time observation network of ocean-bottom-seismometers deployed at the Sagami trough subduction zone, central Japan, Marine Geophysical Researches 20: 73-94, 1998 ("Eguchi").

Kirk, A Three-Component Ocean Bottom Seismograph for controlled Source and Earthquake Seismology, Marine Geophysical Researches 5, 1982, 327-341 ("Kirk").

Petition for Inter Partes Review of U.S. Pat. No. Re. 45,268, dated Apr. 27, 2018.

Petition for Inter Partes Review of U.S. Pat. No. 8,879,362, dated Apr. 27, 2018.

Petition for Inter Partes Review of U.S. Pat. No. 8,228,761, dated Apr. 27, 2018.

\* cited by examiner

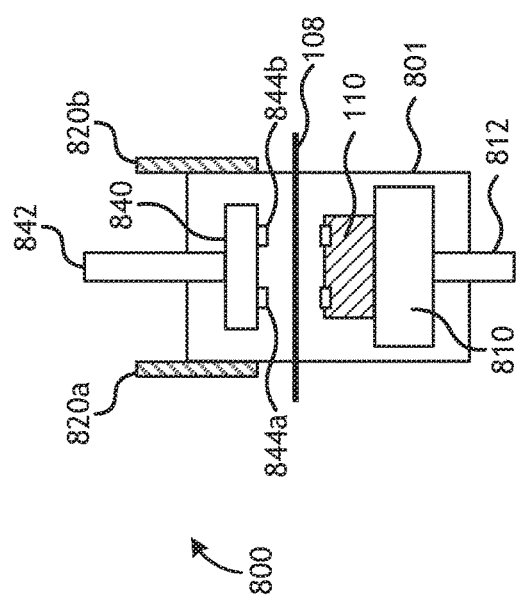
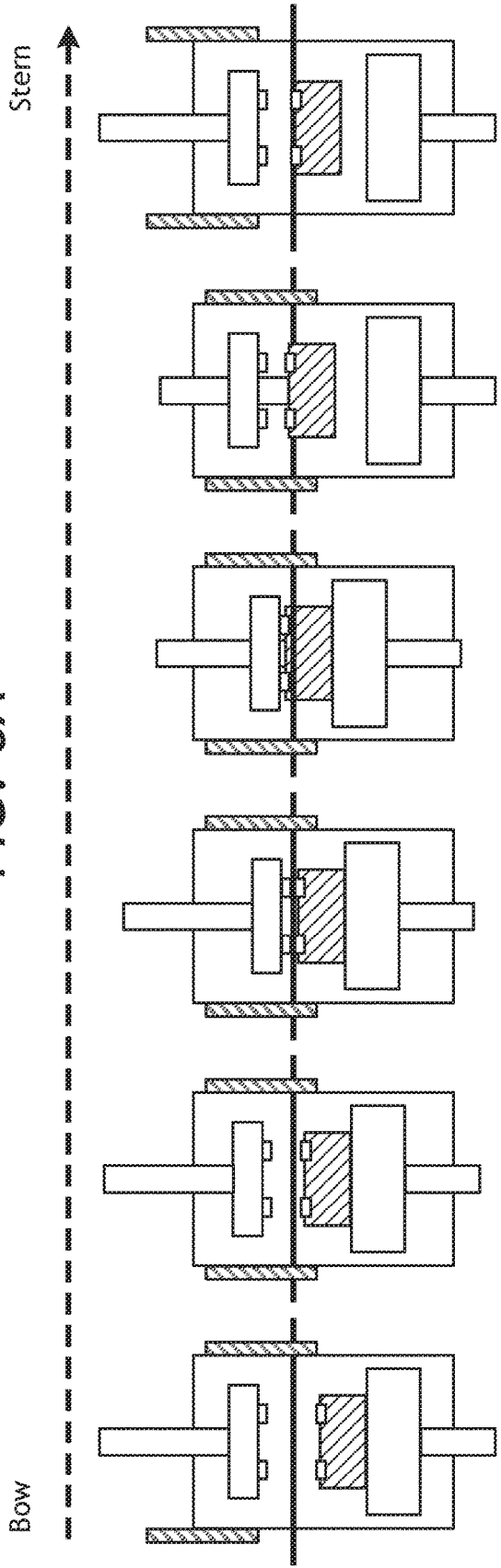

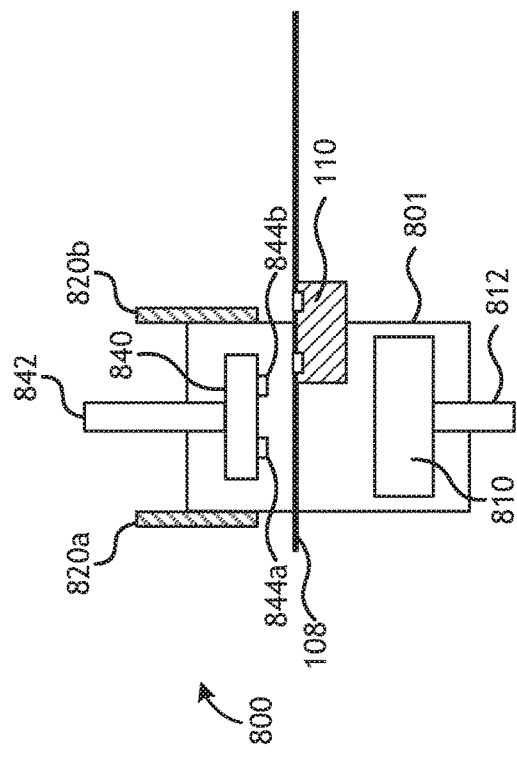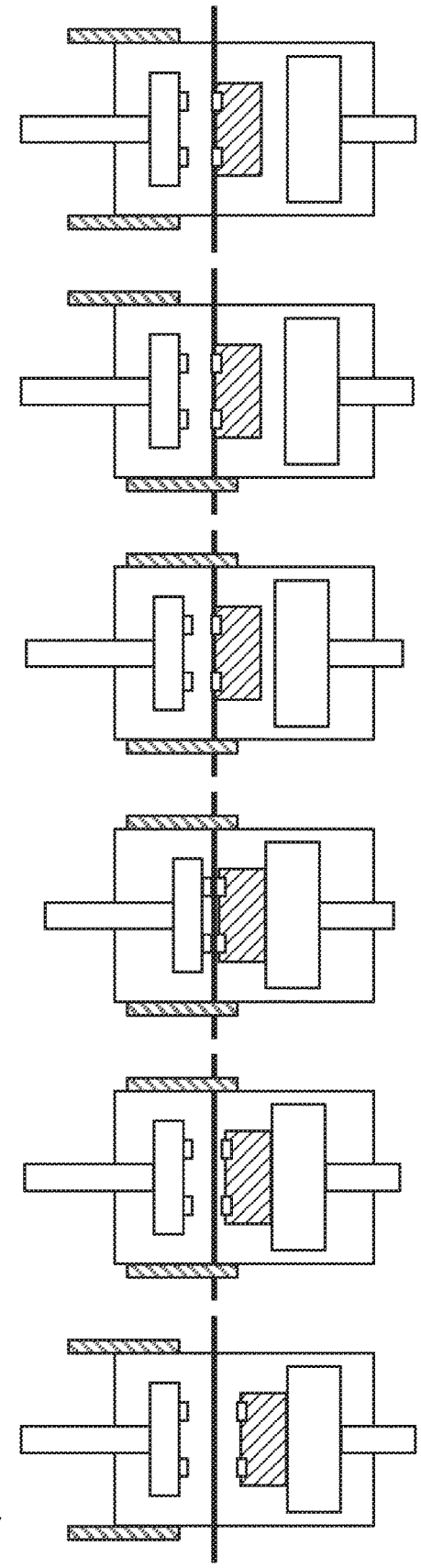

SYSTEM FOR AUTOMATICALLY ATTACHING AND DETACHING SEISMIC NODES DIRECTLY TO A DEPLOYMENT CABLE

PRIORITY

The present application is a continuation of U.S. application Ser. No. 15/366,325, filed on Dec. 1, 2016, which is a continuation of U.S. application Ser. No. 14/820,306, filed on Aug. 6, 2015, now U.S. Pat. No. 9,541,663, which claims priority to U.S. provisional patent application No. 62/034,620, filed on Aug. 7, 2014. The entire contents of each of the above documents is incorporated herein by reference.

BACKGROUND OF THE INVENTION

Field of the Invention

This invention relates to marine seismic systems and more particularly relates to the automatic attachment and/or detachment of autonomous seismic nodes to a deployment cable.

Description of the Related Art

Marine seismic data acquisition and processing generates a profile (image) of a geophysical structure under the seafloor. Reflection seismology is a method of geophysical exploration to determine the properties of the Earth's subsurface, which is especially helpful in determining an accurate location of oil and gas reservoirs or any targeted features. Marine reflection seismology is based on using a controlled source of energy (typically acoustic energy) that sends the energy through seawater and subsurface geologic formations. The transmitted acoustic energy propagates downwardly through the subsurface as acoustic waves, also referred to as seismic waves or signals. By measuring the time it takes for the reflections or refractions to come back to seismic receivers (also known as seismic data recorders or nodes), it is possible to evaluate the depth of features causing such reflections. These features may be associated with subterranean hydrocarbon deposits or other geological structures of interest.

In general, either ocean bottom cables (OBC) or ocean bottom nodes (OBN) are placed on the seabed. For OBC systems, a cable is placed on the seabed by a surface vessel and may include a large number of seismic sensors, typically connected every 25 or 50 meters into the cable. The cable provides support to the sensors, and acts as a transmission medium for power to the sensors and data received from the sensors. One such commercial system is offered by Sercel under the name SeaRay®. Regarding OBN systems, and as compared to seismic streamers and OBC systems, OBN systems have nodes that are discrete, autonomous units (no direct connection to other nodes or to the marine vessel) where data is stored and recorded during a seismic survey. One such OBN system is offered by the Applicant under the name Trilobit®. For OBN systems, seismic data recorders are placed directly on the ocean bottom by a variety of mechanisms, including by the use of one or more of Autonomous Underwater Vehicles (AUVs), Remotely Operated Vehicles (ROVs), by dropping or diving from a surface or subsurface vessel, or by attaching autonomous nodes to a cable that is deployed behind a marine vessel.

Autonomous ocean bottom nodes are independent seismometers, and in a typical application they are self-contained units comprising a housing, frame, skeleton, or shell that includes various internal components such as geophone and hydrophone sensors, a data recording unit, a reference clock for time synchronization, and a power source. The power sources are typically battery-powered, and in some instances the batteries are rechargeable. In operation, the nodes remain on the seafloor for an extended period of time. Once the data recorders are retrieved, the data is downloaded and batteries may be replaced or recharged in preparation of the next deployment One known node storage, deployment, and retrieval system is disclosed in U.S. Pat. No. 7,883,292 to Thompson, et al. ("Thompson '292"), and is incorporated herein by reference. Thompson et al. discloses a method and apparatus for storing, deploying and retrieving a plurality of seismic devices, and discloses attaching the node to the deployment line by using a rope, tether, chain, or other cable such as a lanyard that is tied or otherwise fastened to each node and to a node attachment point on the deployment line. U.S. Pat. No. 7,990,803 to Ray et al. ("Ray") discloses a method for attaching an ocean bottom node to a deployment cable and deploying that node into the water. U.S. Pat. No. 6,024,344 to Buckley, et al. ("Buckley") also involves attaching seismic nodes to the deployment line. Buckley teaches that each node may be connected to a wire that is then connected to the deployment line though a separate connector. This connecting wire approach is cumbersome because the wires can get tangled or knotted, and the seismic nodes and related wiring can become snagged or tangled with structures or debris in the water or on the sea floor or on the marine vessel. U.S. Pat. No. 8,427,900 to Fleure, et al. ("Fleure") and U.S. Pat. No. 8,675,446 to Gateman, et al. ("Gateman") each disclose a deployment line with integral node casings or housings for receiving seismic nodes or data recorders. One problem with integration of the casings with the deployment line is that the deployment line becomes difficult to manage and store. The integrated casings make the line difficult to wind onto spools or otherwise store manageably. In these embodiments, the node casings remain attached directly in-line with the cable, and therefore, this is a difficult and complex operation to separate the electronics sensor package from the node casings.

The referenced shortcomings are not intended to be exhaustive, but rather are among many that tend to impair the effectiveness of previously known techniques in seafloor deployment systems; however, those mentioned here are sufficient to demonstrate that the methodologies appearing in the art have not been satisfactory and that a significant need exists for the systems, apparatuses, and techniques described and claimed in this disclosure.

The existing techniques for attaching an autonomous node to a cable suffer from many disadvantages. For example, many conventional techniques manually attach a node to a cable, which can be dangerous, time consuming, and inefficient. Some techniques attach a node to a rope that is separately coupled to the deployment line, which often gets tangled during deployment and/or retrieval to the seabed, and the node does not consistently land flat on the seabed, which can cause poor seabed/node coupling and noise. The spiraling of the tether cable can also cause problems during the retrieval when separating the node from the cable. Further, prior techniques of pre-mounted node casings on the deployment line or pre-cut connecting ropes/wires between the node and the deployment line do not allow for a flexible change in adjacent node spacing/distance; any change of node spacing requires significant amount of cost and time. A marine vessel should be configured to efficiently attach and detach nodes before and after their use in the water. A novel node deployment system is needed that is autonomous, limits the need for operator involvement, handling, and attaching/detaching of the nodes, and is very fast and efficient. A novel node attachment and deployment system is needed that can directly attach nodes to a deployment line in predetermined and/or variable positions and provide more accurate placement and coupling of the nodes to the cable.

SUMMARY OF THE INVENTION

Embodiments, including apparatuses, systems and methods, for attaching and detaching seismic devices to a deployment cable, including a plurality of autonomous seismic nodes. Other devices besides a node may be attached and detached from the deployment line if they are coupled to one or more direct attachment mechanisms.

In one embodiment, a node installation system may include a moveable node carrier coupled to a cable detection device and a node attachment device that is configured to move a direct attachment mechanism on a node into a locking or closed position about the deployment cable. In an embodiment for retrieval and/or detachment operations, the system may also be configured to automatically detect the position of a node and remove the node from the deployment line by actuating a direct attachment mechanism on the node into an open or unlocked position. The system may be located within a portable shipping container that may be transferred to the back deck of a marine vessel. In a further embodiment, the system may comprise a fail safe node remover.

In one embodiment, a method of automatically attaching seismic nodes to a deployment line includes positioning at least one autonomous seismic node with at least one direct attachment mechanism next to a length of a deployment line, accelerating the at least one autonomous seismic node to a speed that is approximately the same speed as the deployment line, attaching the at least one direct attachment mechanism to the deployment line with a node installation device. The method may further comprise automatically detecting a node placement position on the deployment line, locking at least one direct attachment mechanism onto the deployment line, and detaching a plurality of autonomous seismic nodes from the deployment line.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

FIGS. 8A-8N are side view diagrams illustrating one embodiment of a node installation device in multiple operating positions for node attachment and node detachment to a cable.

DETAILED DESCRIPTION

Various features and advantageous details are explained more fully with reference to the non-limiting embodiments that are illustrated in the accompanying drawings and detailed in the following description. Descriptions of well-known starting materials, processing techniques, components, and equipment are omitted so as not to unnecessarily obscure the invention in detail. It should be understood, however, that the detailed description and the specific examples, while indicating embodiments of the invention, are given by way of illustration only, and not by way of limitation. Various substitutions, modifications, additions, and/or rearrangements within the spirit and/or scope of the underlying inventive concept will become apparent to those skilled in the art from this disclosure. The following detailed description does not limit the invention.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures, or characteristics may be combined in any suitable manner in one or more embodiments.

Node Deployment

Figure 1A:
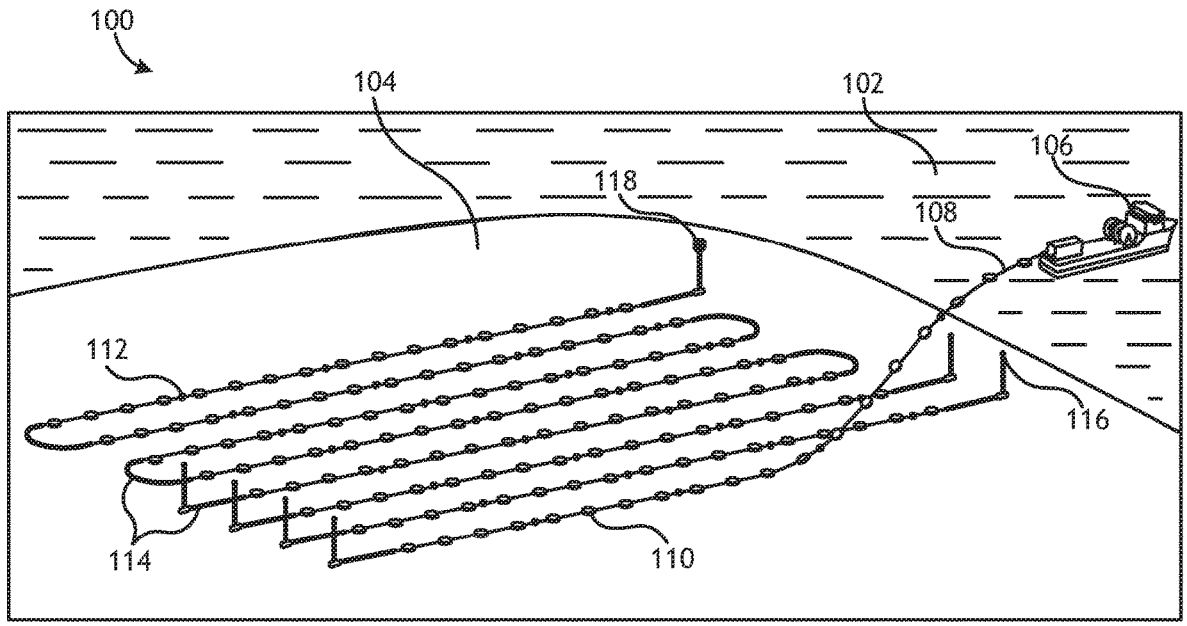
FIG. 1A is a schematic diagram illustrating one embodiment of a system for marine deployment of an autonomous seismic node.
Figure 1B:
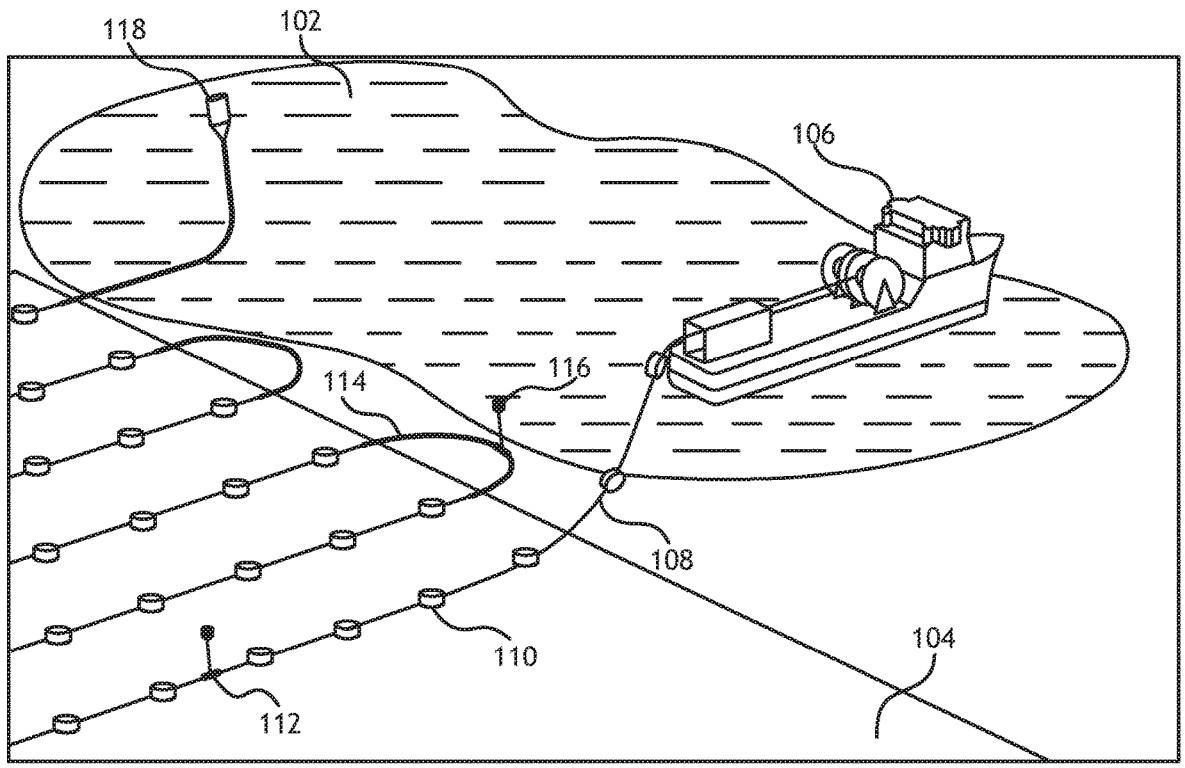
FIG. 1B is a schematic diagram illustrating one embodiment of a system for marine deployment of an autonomous seismic node.

FIGS. 1A and 1B illustrate a layout of a seabed seismic recorder system that may be used with autonomous seismic nodes for marine deployment. FIG. 1A is a diagram illustrating one embodiment of a marine deployment system 100 for marine deployment of seismic nodes 110. One or more marine vessels deploy and recover a cable (or rope) with attached sensor nodes according to a particular survey pattern. In an embodiment, the system includes a marine vessel 106 designed to float on a surface 102 of a body of water, which may be a river, lake, ocean, or any other body of water. The marine vessel 106 may deploy the seismic nodes 110 in the body of water or on the floor 104 of the body of water, such as a seabed. In an embodiment, the marine vessel 106 may include one or more deployment lines 108. One or more seismic nodes 110 may be attached directly to the deployment line 108. Additionally, the marine deployment system 100 may include one or more acoustic positioning transponders 112, one or more weights 114, one or more pop up buoys 116, and one or more surface buoys 118. As is standard in the art, weights 114 can be used at various positions of the cable to facilitate the lowering and positioning of the cable, and surface buoys 118 or pop up buoys 116 may be used on the cable to locate, retrieve, and/or raise various portions of the cable. Acoustic positioning transponders 112 may also be used selectively on various portions of the cable to determine the positions of the cable/sensors during deployment and post deployment. The acoustic positioning transponders 112 may transmit on request an acoustic signal to the marine vessel for indicating the positioning of seismic nodes 110 on sea floor 104. In an embodiment, weights 114 may be coupled to deployment line 108 and be arranged to keep the seismic nodes 110 in a specific position relative to sea floor 104 at various points, such as during start, stop, and snaking of deployment line 108.

FIG. 1B is a close-up view illustrating one embodiment of a system 100 for marine deployment of seismic nodes 110. In an embodiment, the deployment line 108 may be a metal cable (steel, galvanized steel, or stainless steel). Alternatively, the deployment line 108 may include chain linkage, rope (polymer), wire, or any other suitable material for tethering to the marine vessel 106 and deploying one or more seismic nodes 110. In an embodiment, the deployment line 108 and the seismic nodes 110 may be stored on the marine vessel 106. For example, the deployment line may be stored on a spool or reel or winch. The seismic nodes 110 may be stored in one or more storage containers. One of ordinary skill may recognize alternative methods for storing and deploying the deployment line 108 and the seismic nodes 110.

In one embodiment, the deployment line 108 and seismic nodes 110 are stored on marine vessel 106 and deployed from a back deck of the vessel 106, although other deployment locations from the vessel can be used. As is well known in the art, a deployment line 108, such as a rope or cable, with a weight attached to its free end is dropped from the back deck of the vessel. The seismic nodes 110 are preferably directly attached in-line to the deployment line 108 at a regular, variable, or selectable interval (such as 25 meters) while the deployment line 108 is lowered through the water column and draped linearly or at varied spacing onto the seabed. During recovery each seismic node 110 may be clipped off the deployment line 108 as it reaches deck level of the vessel 106. Preferably, nodes 110 are attached directly onto the deployment line 108 in an automated process using node attachment or coupling machines on board the deck of the marine vessel 106 at one or more workstations or containers. Likewise, a node detaching or decoupling machine is configured to detach or otherwise disengage the seismic nodes 110 from the deployment line 108, and in some instances may use a detachment tool for such detaching. Alternatively, seismic nodes 110 can be attached via manual or semi-automatic methods. The seismic nodes 110 can be attached to the deployment line 108 in a variety of configurations, which allows for proper rotation of the seismic node 110 about the deployment line 108 and allows for minimal axial movement on deployment line 108. For example, the deployment line 108 can be attached to the top, side, or center of seismic node 110 via a variety of configurations.

Once the deployment line 108 and the seismic nodes 110 are deployed on the sea floor 104, a seismic survey can be performed. One or more marine vessels 106 may contain a seismic energy source (not shown) and transmit acoustic signals to the sea floor 104 for data acquisition by the seismic nodes 110. Embodiments of the system 100 may be deployed in both coastal and offshore waters in various depths of water. For example, the system may be deployed in a few meters of water or in up to several thousand meters of water. In some embodiments, the depth may be between twenty (20) meters and five hundred (500) meters or more. In some configurations surface buoy 118 or pop up buoy 116 may be retrieved by marine vessel 106 when the seismic nodes 110 are to be retrieved from the sea floor 104. Thus, the system 110 may not require retrieval by means of a submersible or diver. Rather, pop up buoy 116 or surface buoy 118 may be picked up on the surface 102 and deployment line 108 may be retrieved along with seismic nodes 110.

Autonomous Seismic Node Design

Figure 2A:
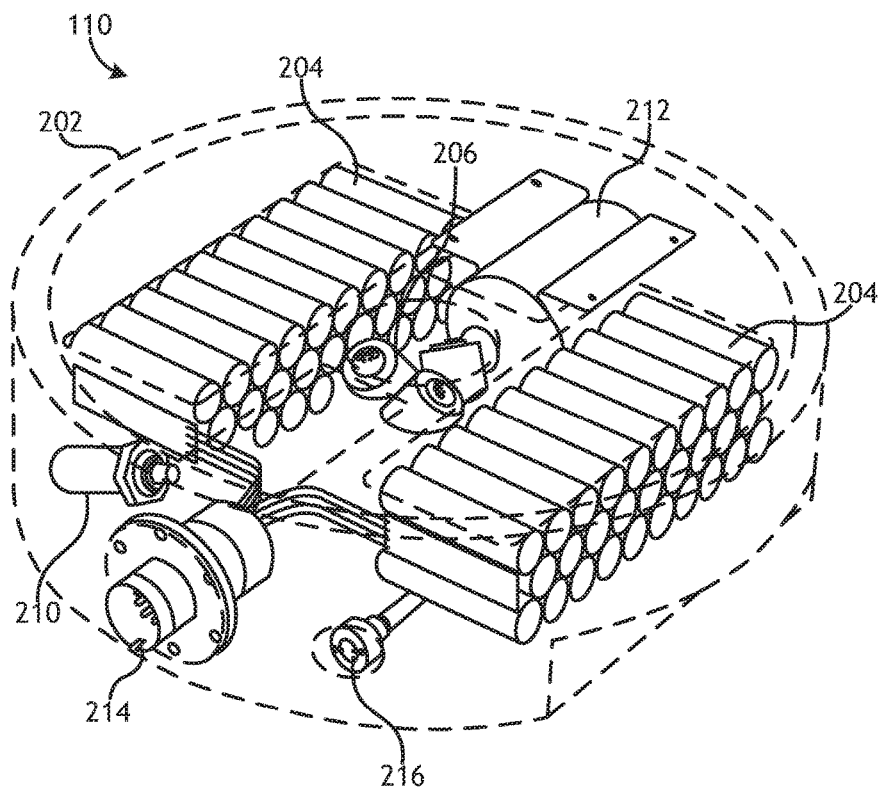
FIG. 2A illustrates a perspective view diagram of one embodiment of an autonomous seismic node.

FIG. 2A illustrates a perspective view diagram of an autonomous ocean bottom seismic node 110. The seismic node 110 may include a body 202, such as a housing, frame, skeleton, or shell, which may be easily dissembled into various components. Additionally, the seismic node 110 may include one or more battery cells 204. In an embodiment, the battery cells 204 may be lithium-ion battery cells or rechargeable battery packs for an extended endurance (such as 90 days) on the seabed, but one of ordinary skill will recognize that a variety of alternative battery cell types or configurations may also be used. Additionally, the seismic node may include a pressure release valve 216 configured to release unwanted pressure from the seismic node 110 at a pre-set level. The valve protects against fault conditions like water intrusion and outgassing from a battery package. Additionally, the seismic node may include an electrical connector 214 configured to allow external access to information stored by internal electrical components, data communication, and power transfer. During the deployment the connector is covered by a pressure proof watertight cap 218 (shown in FIG. 2B). In other embodiments, the node does not have an external connector and data is transferred to and from the node wirelessly, such as via electromagnetic or optical links.

In an embodiment, the internal electrical components may include one or more hydrophones 210, one or more (preferably three) geophones 206 or accelerometers, and a data recorder 212. In an embodiment, the data recorder 212 may be a digital autonomous recorder configured to store digital data generated by the sensors or data receivers, such as hydrophone 210 and the one or more geophones or accelerometers 206. One of ordinary skill will recognize that more or fewer components may be included in the seismic node 110. For example, there are a variety of sensors that can be incorporated into the node including and not exclusively, inclinometers, rotation sensors, translation sensors, heading sensors, and magnetometers. Except for the hydrophone, these components are preferably contained within the node housing that is resistant to temperatures and pressures at the bottom of the ocean, as is well known in the art.

Figure 2B:
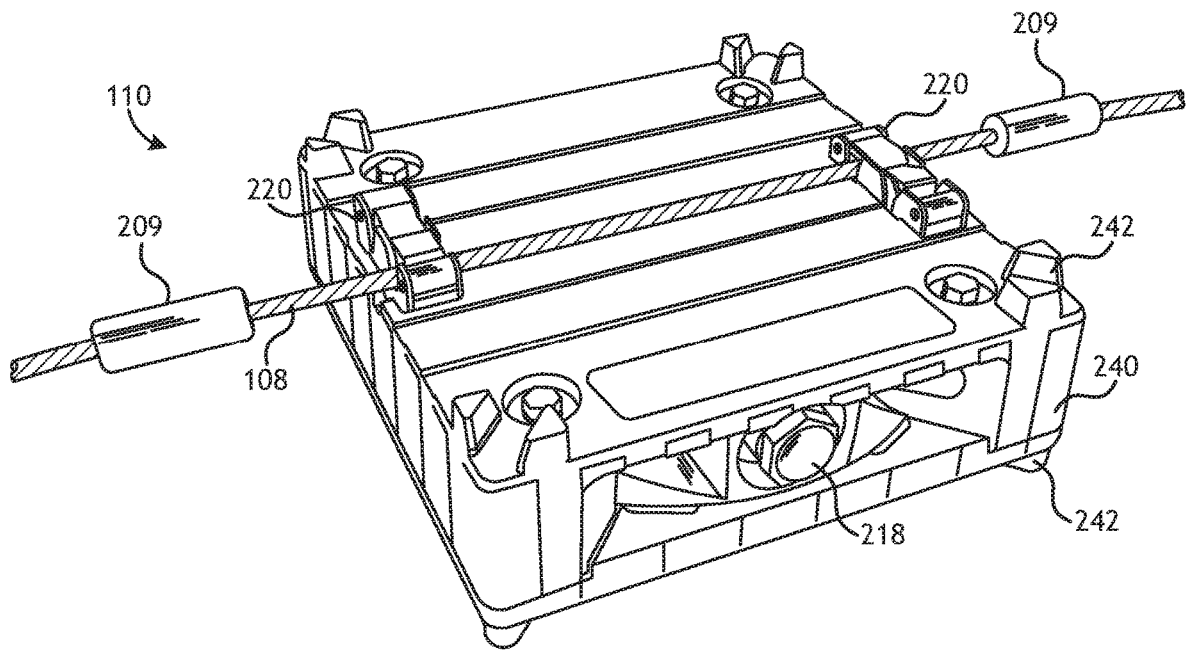
FIG. 2B illustrates a perspective view diagram of another embodiment of an autonomous seismic node.

While the node in FIG. 2A is circular in shape, the node can be any variety of geometric configurations, including square, rectangular, hexagonal, octagonal, cylindrical, and spherical, among other designs, and may or may not be symmetrical about its central axis. In one embodiment, the node consists of a watertight, sealed case or pressure housing that contains all of the node's internal components. In one embodiment, the node is square or substantially square shaped so as to be substantially a quadrilateral, as shown in FIG. 2B. One of skill in the art will recognize that such a node is not a two-dimensional object, but includes a height, and in one embodiment may be considered a box, cube, elongated cube, or cuboid. In one embodiment, the node is approximately 350 mm×350 mm wide/deep with a height of approximately 150 mm. In one embodiment, the body 202 of the node has a height of approximately 100 mm and other coupling features, such as node locks 220 or protrusions 242, may provide an additional 20-50 mm or more height to the node.

In another embodiment, as shown in FIG. 2B, the node's pressure housing may be coupled to and/or substantially surrounded by an external non-pressurized node housing 240 that may include integrated fenders and/or bumpers. Various portions of the node housing 240 may be open and expose the pressurized node housing as needed, such as for hydrophone 210, node locks 220, and data/power transfer connection 214 (shown with a fitted pressure cap 218 in FIG. 2B). In one embodiment, the upper and lower portions of the fender housing include a plurality of gripping teeth or protrusions 242 for engaging the seabed and for general storage and handling needs. In other embodiments, a bumper is attached to each of the corners of the node housing via bolts or pins. In another embodiment, portions of the housing, such as the corners, include grooved pockets or recesses or receptacles that engage a corresponding mating unit on the node housing for integrated stacking/storing of the nodes. External node housing 240 provides many functions, such as protecting the node from shocks and rough treatment, coupling the node to the seabed for better readings and stability, and assisting in the stackability, storing, alignment, and handling of the nodes. Each node housing may be made of a durable material such as rubber, plastic, carbon fiber, or metal. In still other embodiments, the seismic node 110 may include a protective shell or bumper configured to protect the body.

Node Locks

In one embodiment, the seismic node 110 comprises one or more direct attachment mechanisms and/or node locks 220 that may be configured to directly attach the seismic node 110 to a deployment line 108. This may be referred to as direct or in-line node coupling. In one embodiment, the attachment mechanism 220 comprises a locking mechanism to help secure or retain the deployment line 108 to the seismic node 110. A plurality of direct attachment mechanisms may be located on any surfaces of the node 110 or node housing 240. In one embodiment, a plurality of node locks 220 is positioned substantially in the center and/or middle of a surface of a node or node housing. The node locks may attach directly to the pressure housing and extend through the node housing 240. In this embodiment, a deployment line, when coupled to the plurality of node locks, is substantially coupled to the seismic node on its center axis. In some embodiments, the node locks may be offset or partially offset from the center axis of the node, which may aid the balance and handling of the node during deployment and retrieval. The node locks 220 are configured to attach, couple, and/or engage a portion of the deployment line to the node. Thus, a plurality of node locks 220 operates to couple a plurality of portions of the deployment line to the node. The node locks are configured to keep the deployment line fastened to the node during a seismic survey, such as during deployment from a vessel until the node reaches the seabed, during recording of seismic data while on the seabed, and during retrieval of the node from the seabed to a recovery vessel. The disclosed attachment mechanism 220 may be moved from an open and/or unlocked position to a closed and/or locked position via autonomous, semi-autonomous, or manual methods. In one embodiment, the components of node lock 220 are made of titanium, stainless steel, aluminum, marine bronze, and/or other substantially inert and non-corrosive materials.

As shown in FIG. 2B, two node locks 220 are positioned substantially in the middle top face of the node. The node locks may be asymmetrical and oriented in opposing and/or offset orientations for better stability when deploying and retrieving the node from the seabed and for manufacturing/assembly purposes. Node locks may be configured in a positively open and/or a positively closed position, depending on the type of coupling/decoupling machines used. In some embodiments, a spring mechanism is used to bias the node lock in a closed and/or open position, and in other embodiments other biasing members may be used, such as a flexible plate, a torsion spring, or other bendable/twistable biasing members, as well as offset travel paths for the deployment wire causing it to act as a spring due to its in-line stiffness. A ferrule or other stopping mechanism 209 may be located on either side of the node on the deployment line, which helps prevent movement of the node on the deployment line, facilitates attaching/detaching of the node from the line, and facilitates seismic acoustic decoupling between the deployment line and the node. In other embodiments, ferrules and other stoppers can be used as a single stop between adjacent nodes (e.g., only one ferrule between each node), a plurality of redundant stoppers can be used between each node, or a double stopper and swivel type arrangement can be used between each node. A ferrule or stopper may limit the movement of the node by many configurations, such as by a sliding attachment point where the node slides between the stoppers, or the stopper may slide inside a cavity of the node and act as a sliding cavity stopper. The position of the stopper(s) on the deployment line and the coupling of the node to the deployment line is configured for acoustic decoupling between the node and the deployment line. In one embodiment, the distance between adjacent ferrules is greater than the width of the node, which facilitates the node to be seismically de-coupled from the wire/rope of the deployment line. In some embodiments, each node lock acts as a swivel to allow rotation of the node around the deployment line.

Figure 2C:
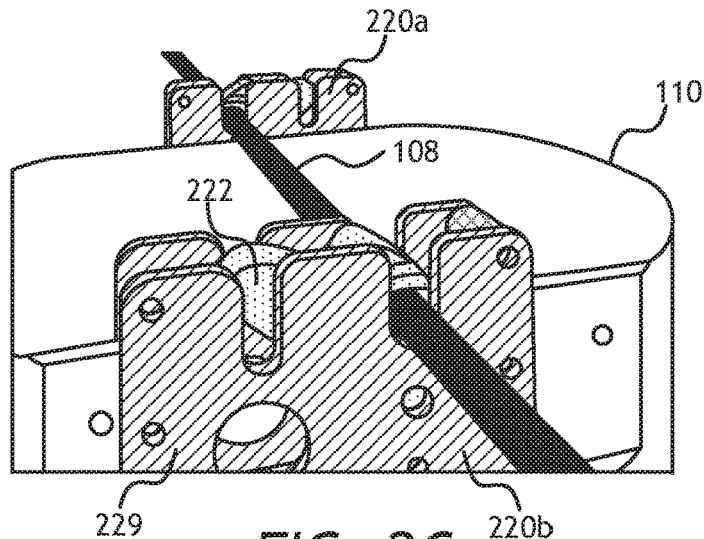
FIG. 2C illustrates a perspective view diagram of one embodiment of a direct attachment mechanism that may be coupled to an autonomous seismic node.
Figure 2D:
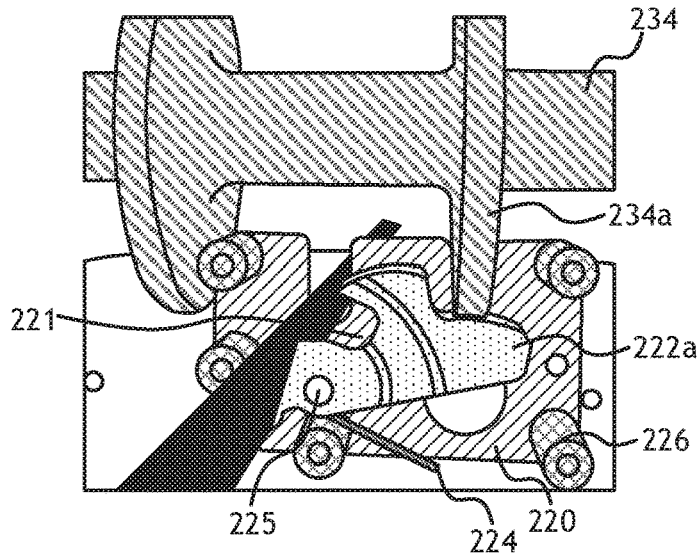
FIG. 2D illustrates a perspective view diagram of one embodiment of actuating the direct attachment mechanism from FIG. 2C.
Figure 2E:
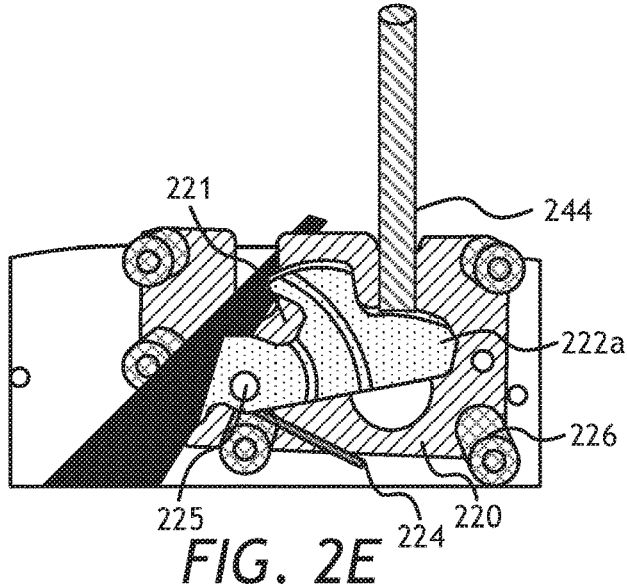
FIG. 2E illustrates a perspective view diagram of another embodiment of actuating the direct attachment mechanism from FIG. 2C.

FIGS. 2C-2E illustrate perspective views of a direct attachment mechanism or node lock 220 that may be coupled to an autonomous seismic node. Node 110 may be coupled to a plurality of node locks 220. Node lock 220 is shown in a closed and/or locked position in FIG. 2C and in an open and/or unlocked position in FIG. 2D. Node lock 220 may comprise a latch 222 that is configured to move between an open and/or unlocked position and a closed and/or locked position. Thus, node lock 220 may move between an open and closed position by actuation of latch 222. Node lock 220 may comprise one or more plates 229 separate by one or more spacers 226. Latch 222 may be coupled to a biasing mechanism or spring 224 and a latch pin or shaft 225. Latch 222 is able to move from an open position to a closed position by rotation of the latch around shaft 225 and is kept in a closed position by the spring. The latch may be actuated and/or opened by depressing and/or engaging portion 222a of the latch. When 222a is not depressed, spring 224 biases the latch to a closed position. Node lock 220 further comprises an opening 221 that is configured to receive a deployment line 108 and may be formed between face plates 229 and latch 222. In one embodiment, opening 221 is configured to receive a wide variety of other structures, such as rope, rods, shafts, pins, and other cylindrical or non-cylindrical objects. The node lock is in an open position when the opening 221 is open and/or configured to receive a deployment line (e.g., the latch is depressed at portion 222a) and is in a closed position when the opening 221 is closed and/or not configured to receive a retaining structure (e.g., the latch portion 222a is not actuated). For example, FIG. 2C shows the node lock in a closed position and FIGS. 2D and 2E show the node lock in an open position. By opening and closing node lock 220, the lock is configured to retain and release a deployment line or other similar fastening object. In some embodiments, latch 222 may have a weak portion that is configured to break when a predetermined amount of force is applied to the node (whether directly or through the deployment line). For example, in some situations a node lock may fail and/or the latch may not move between a closed and an open position. To remove the node from the deployment line, the node lock may need to be forcibly removed from the line and/or node. Various manual and/or automatic methods may be used to apply a predetermined force to the node lock to break a weak latch portion of the node lock. Thus, in some situations, the deployment line may be safely removed and/or de-coupled from the seismic node.

In one embodiment, node lock 220 remains in a locked position by a spring or other biasing mechanism unless actuated and/or specifically opened. As shown in FIG. 2D, node lock 220 may be actuated from a closed position to an open position by a locking/unlocking tool or mechanism 234, which may be a roller in one embodiment. Roller 234 may depress a portion of the node lock (such as latch portion 222a) to move the lock into an open position. The roller may comprise one or more flanges or protrusions 234a that may slide along one or more guides or channels on the node and/or node locks and may be used to restrain the deployment line during coupling to the node lock and to actuate and/or depress the node lock to move it from an open positioned to a closed position (and vice versa). In one embodiment, the roller is designed with a double flange to contact and depress the locks on either side of the node irrespective of the direction of travel of the node. In other embodiments, attachment/detachment tool 234 may be a flat steel bar, rod, or fork that may be used manually or automatically to push the lock open. For example, as shown in FIG. 2E, node lock 220 may be actuated by a moving rod or cylinder point 244 that depresses latch portion 222a. In still other embodiments, a plate or one or more contact points on a plate may depress and/or contact latch 222 and move it between a closed position and an open position.

While the node locks in this disclosure are described in the context of autonomous seismic nodes, direct attachment mechanisms and/or node locks 220 may be coupled directly to any device (such as a transponder or weight) or even a coupling case surrounding the device. Thus, the described node attachment/detachment system may be used to attach and detach a plurality of different devices, tools, and/or instruments in a similar manner to a deployment cable as to a node.

Node Deployment and Retrieval System

Figure 3:
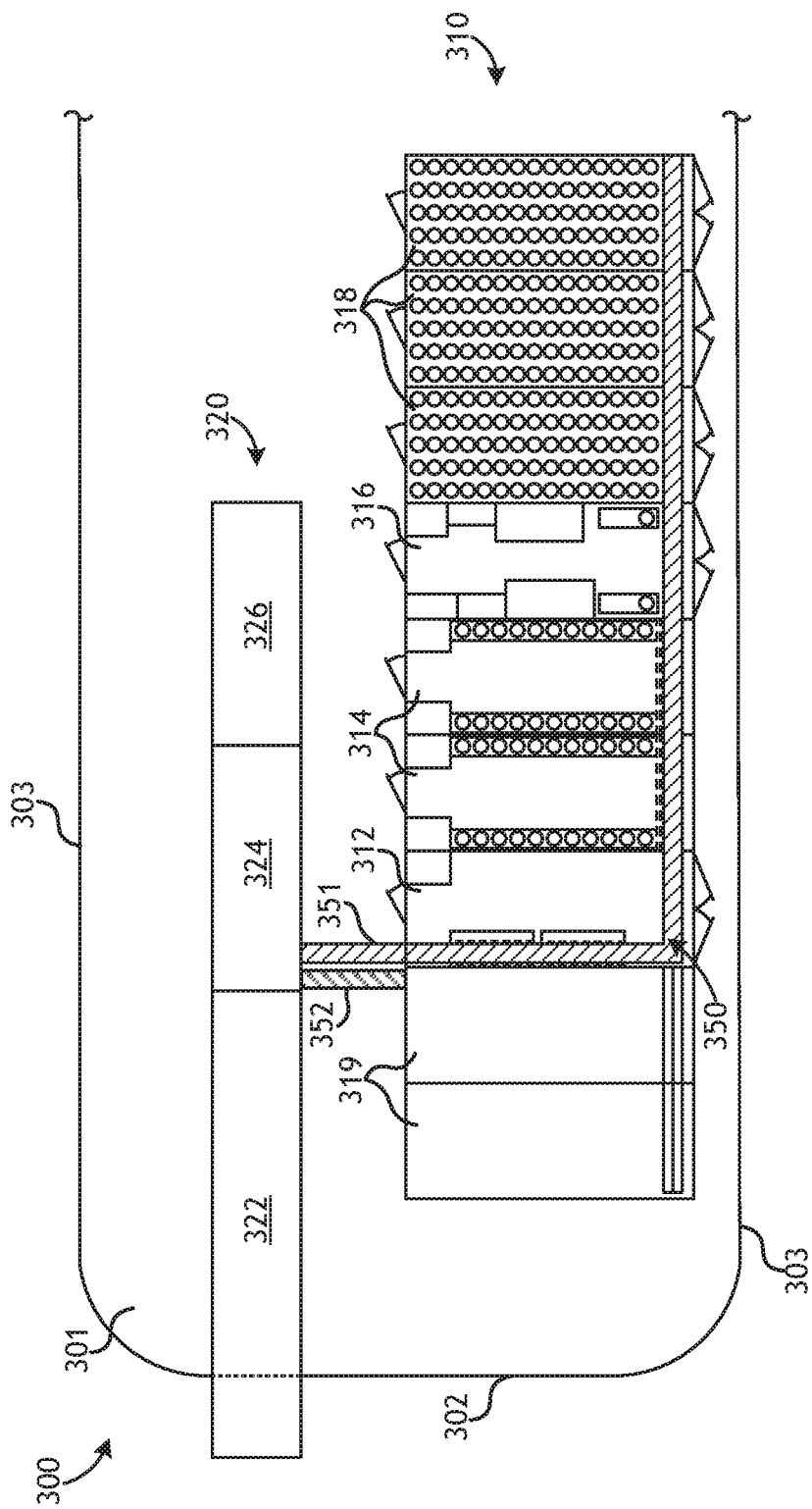
FIG. 3 is a schematic diagram illustrating one embodiment of a node deployment system and a node storage and service system on the back deck of a marine vessel.

As mentioned above, to perform a seismic survey that utilizes autonomous seismic nodes, those nodes must be deployed and retrieved from a vessel, typically a surface vessel. FIG. 3 illustrates a schematic of one embodiment of a deck handling system 300 of a surface vessel. While the deck handling system may be located on any portion of the vessel, in one embodiment it is located on the back deck of a marine vessel. Of relevance to FIG. 3, the vessel 301 comprises a back, end, or aft section 302 and two sides 303. For convenience purposes, the rest of the marine vessel is not shown in FIG. 3. As shown, in one embodiment a node storage and service system 310 is coupled to one or more deployment systems 320. Node storage and service system 310 is configured to handle and store the nodes before and after the deployment and retrieval operations performed by node deployment system 320, and is described in more detail in U.S. patent application Ser. No. 14/711,262, filed on May 13, 2015, incorporated herein by reference. Node storage and service system 310 is configured such that each operational task is located within a container. In one embodiment, each container has separate control systems for local and/or remote operation of the tasks performed in the container. With this modular/container-based system, the addition and/or removal of service and storage containers based on the particular survey and/or vessel requirements is straightforward. In one embodiment, node storage and service system 310 consists of a plurality of containers, including cleaning container 312, charging/downloading containers 314, service/maintenance container 316, storage containers 318, and auxiliary containers 319, which are interconnected by conveyor or transport system 350. In one embodiment, transport system 350 comprises a conveyor section 351 that couples deployment system 320 to node storage and service system 310 and conveyor section 352 that is configured to transfer auxiliary equipment (such as weights and transponders) between the deployment system and the node storage and service system. This invention is not dependent upon the particular storage and service system utilized on board the vessel.

In a first or deployment mode, node deployment system 320 is configured to receive nodes from node storage and service system 310, to couple those nodes to a deployment line, and to deploy those nodes into a body of water. In a second or retrieval mode, node deployment system 320 is configured to retrieve nodes from a body of water, de-couple those nodes from a deployment line, and to transfer those nodes to node storage and service system 310. Thus, node deployment system 320 may also be characterized as a node retrieval system in some situations. In one embodiment, the deployment line is stopped in the correct position and the seismic node is manually attached to the deployment line, and in another embodiment the seismic node is accelerated to match the deployment speed of the deployment line and automatically attached to the deployment line. At the same time, via an automatic, semi-automatic, or manual process, auxiliary equipment (such as weights or transponders) may also be attached to the deployment line at selected intervals. In one embodiment, transponders, weights, and other seismic devices may be directly attached to the deployment cable by coupling one or more node locks to the device and/or to a housing surrounding the device. The node deployment system is also configured to deploy and retrieve a deployment line or cable into and from a body of water. The deployment line and/or cable system may be continuously laid down on the seabed, but in some instances it can be separated and buoyed off at select intervals to cope with obstacles in the water or as required by spread limitations for a particular survey. Any one or more of these steps may be performed via automatic, semi-automatic, or manual methods. In one embodiment, each node is coupled to and/or integrated with a node lock, as described in more detail in U.S. patent application Ser. No. 14/736,926, filed on Jun. 11, 2015, incorporated herein by reference. The node locks (and attached nodes) may be coupled to and decoupled from the deployment line via node deployment system 320.

As shown in FIG. 3, an autonomous seismic node deployment system may include a plurality of containers, with separate containers containing one or more winches in container 326, one or more node installation devices in container 324, and one or more overboard units in container 322, and other devices and/or systems to facilitate deployment and/or retrieval of a plurality of autonomous seismic nodes from the water before and after the nodes are used in a seismic survey. In one embodiment, the node deployment system 320 is configured to attach and detach a plurality of nodes 110 to a deployment cable or rope 108 and for the deployment and retrieval of the cable into the water. In an alternative embodiment, the marine vessel includes two such node deployment systems, with the second system being either a backup or used simultaneously as the first system. In one embodiment, the deployment system receives nodes from the node storage and service system at the node installation container 324. In one embodiment, the overboard unit container 322 facilitates deployment and retrieval of the deployment line with the coupled nodes, and may contain one or more overboard wheels at least partially if not entirely extending off of a back portion of the marine vessel, as described more fully in co-pending U.S. patent application Ser. No. 14/820,285, entitled Overboard System for Deployment and Retrieval of Autonomous Seismic Nodes, filed on Aug. 6, 2015. Deployment system may operate in automatic, semi-automatic, or manual processes. A partially or entirely automated system reduces man-power requirements for deployment and retrieval operations and increase overall safety, efficiency, and reliability of the seismic survey. Additionally, such embodiments may allow for operation in harsh climates.

In some embodiments, the components of the node deployment system may be installed longitudinal in standard or custom-made twenty-foot cargo containers. One embodiment of the node deployment system 320 uses standard sized ISO shipping containers in a plurality of configurations for efficient deployment of the nodes. Standard sized containers are typically 20 or 40 feet long and 8 feet wide. The heights of such containers may vary from 8 feet for standard height containers to 10 feet, 6 inches for high-cube or purpose made containers. In other embodiments, containers may be custom designed and ISO certified. Each container preferably has a floor, roof, and sidewalls, with various portions removed to facilitate transfer of nodes to, from, and within each container as needed, or to allow service personnel access to the container. These containers may include additional frame supports to the floor and/or sides. The content of each container is modified for the particular task of the container, such as line deployment and tensioning, node attaching, and node/line deployment, etc. The containers can be transported via air, road, train, or sea to a destination harbor and mobilized on a suitable vessel. The containers may be transferred to the deck of a vessel via a crane or other lifting device and then secured to the deck and coupled to each other through various fastening mechanisms. The containers may be positioned side to side, end to end, and even on top of each other (up to 3 or 4 levels high) on the deck depending on the specific layout of the containers, need of the survey, and requirements of the vessel. The system setup may vary from job to job and from vessel to vessel, in both layout and number of modules/containers utilized.

Figure 4A:
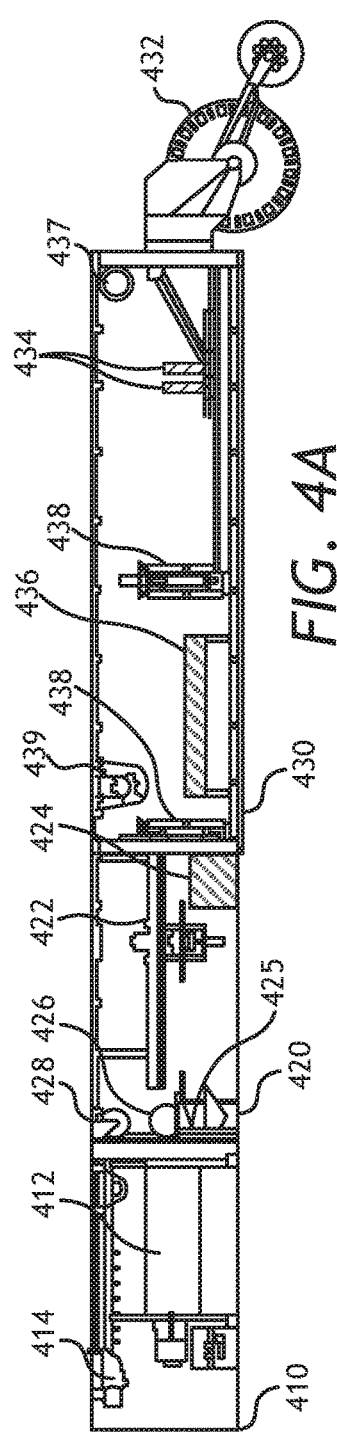
FIG. 4A illustrates a side view of one embodiment of a deployment system.
Figure 4B:
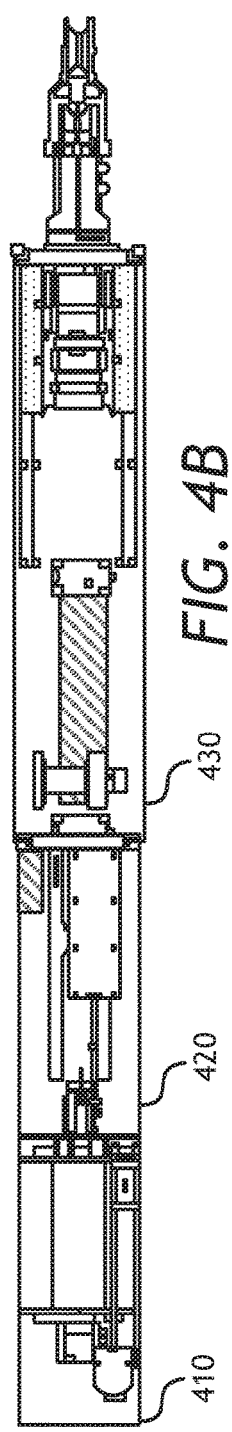
FIG. 4B illustrates a top view of one embodiment of a deployment system.
Figure 4C:
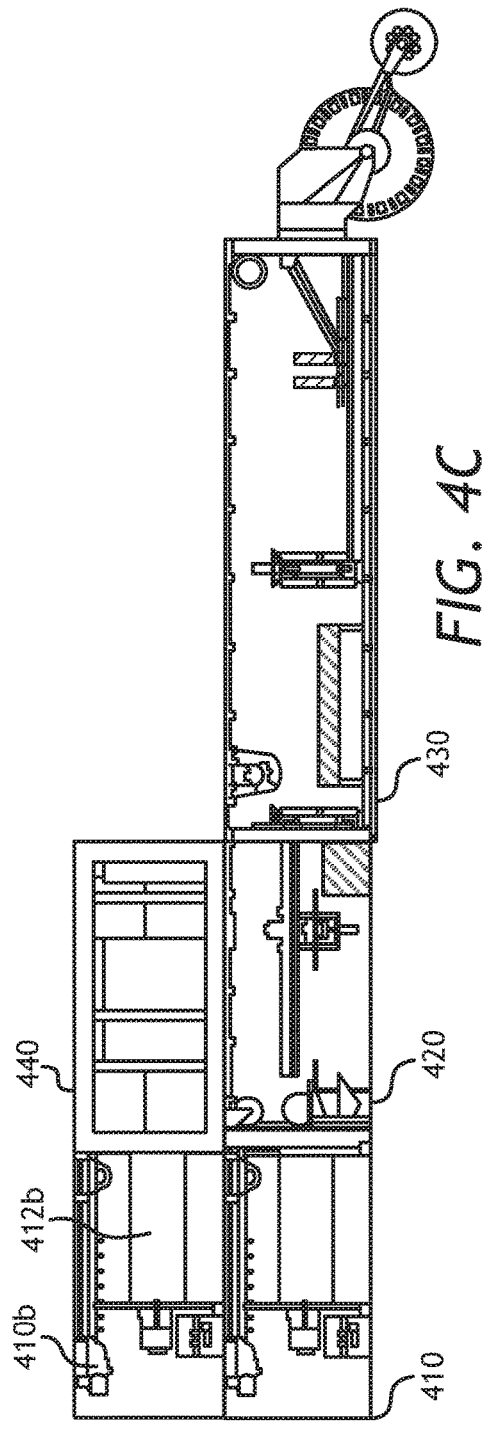
FIG. 4C illustrates a side view of another embodiment of a deployment system.

FIGS. 4A and 4B show various views of a deployment system from a side and top perspective, respectively. Similar to FIG. 3, node deployment system comprises a first container 410 configured to hold a winch system 412, a second container 420 configured to hold a node roping/coupling/attaching system (and, likewise, a deroping/decoupling/detaching system) 422, and a third container 430 configured to hold an overboard unit 432. In one embodiment, the first and second containers are standard 20 foot long containers and the third container is a 40 foot long container. In some embodiments one or more tension control systems 438 and a cleaning system 436 may be utilized that may be located in one of the aforementioned containers, such as overboard unit container 430. Winch system 412 may be coupled to a cable spooling guide 414 that is configured to deploy and retrieve cable from a spool of the winch system and route the cable to node installation container 420. Node attachment system 422 may be coupled to a node feed system 424, a node remover 425, and one or more sheaves 426, 428, all of which may be contained within container 420. In other embodiments containers are not utilized and the components of the node deployment system may be coupled directly to the back deck of a marine vessel. In one embodiment, as shown in FIG. 4C, a second deck or level of containers is utilized for additional components of the node deployment system and/or as back-up components. For example, in one embodiment, node deployment system may comprise an additional winch system 412b located in second winch container 410b which sits upon first winch container 410, and an auxiliary equipment container 440 which sits upon node installation container 420. In some embodiments, portions of the deployment system may extend out over portions of the deck of the marine vessel. For example, a portion of overboard unit container 430 may extend beyond the back deck of a marine vessel. For example, overboard unit 432 may be retractable into and out of overboard unit container 430.

In one embodiment, the node deployment system may comprise one or more control systems, which may comprise or be coupled to a control system located in each container. In one embodiment an operator may be located inside one or more of the containers, or even in a remote location such as off of the vessel, and operate the entire node deployment system. In other embodiments, the control system can be operated from a surveillance cabin or by remote control on the deck or by both locations. In one embodiment, the control system may be designed for variable control tension on the deployment line and may interface various components and systems of the node deployment system (such as the winch, node installation machine, overboard unit, and outboard node detection unit) together for smooth operation during retrieval and deployment. Besides having slow start up and slow down sequences, the system may have quick stop options for emergency situations, which can be activated automatically or manually. In one embodiment, the control system can make various measurements at different portions of the deployment systems, including tension on the cable, angle of the cable, and speed of the cable, and the like. In some embodiments, the control system continuously obtains and utilizes information about vessel roll, yaw, and pitch (speed and amplitude) and other factors (cable speed, tension, and deployed length) to ensure adequate movement and positioning of the overboard system and overboard wheel.

In still other embodiments, the deployment system and/or installation container may include one or more node detection devices used to automatically identify and track nodes during attachment/detachment and deployment/retrieval operations. In one embodiment, such a system includes a radio-frequency identification (RFID) system that shows and identifies a node passing by particular points in the deployment system by radio frequency, as well as other wireless non-contact devices and methods (such as optical detection sensors) that can identify tags and other identification devices coupled to nodes.

Node Installation System

Referring to FIG. 3, in one embodiment the node installation container 324 acts as the intermediate container position in the deployment system between the winch system container 326 and the overboard unit container 322 as well as the transfer point of all nodes between storage and service system 310 and deployment system 320. A node installation system may be located within container 324 and is configured to attach and detach a plurality of nodes to and from a deployment cable. In one embodiment, node installation system may lock/unlock and/or close/open one or more direct attachment mechanisms and/or node locks to the deployment line, which couples the node to the deployment line.

In a first or deployment mode, the node installation system is configured to automatically receive a plurality of nodes from a node storage and service system and to couple those nodes to a deployment line. In a second or retrieval mode, the node installation system is configured to automatically decouple a plurality of nodes from a deployment line and to transfer those nodes to the node storage and service system. Thus, node installation system may also be characterized as a node decoupling or detaching system. The node installation system can be configured to operate in a manual, semi-automatic, or automatic fashion. In the semi-automatic mode, an operator assists the node installation process, where the cable is stopped in the correct position before the node is manually attached to or detached from the cable. In the automatic or semi-automatic mode (which may only need operator supervision), during attachment the node may be accelerated to match the deployment speed of the deployment cable and automatically attached to the deployment line, and in a detachment mode a carrier or detaching device is accelerated to match the retrieval speed of the cable and automatically detaches the node from the cable. Other embodiments may allow the cable to be slowed or temporarily paused prior to attaching or detaching the nodes. These operations may be performed pneumatically, electrically, or hydraulically.

Figure 5A:
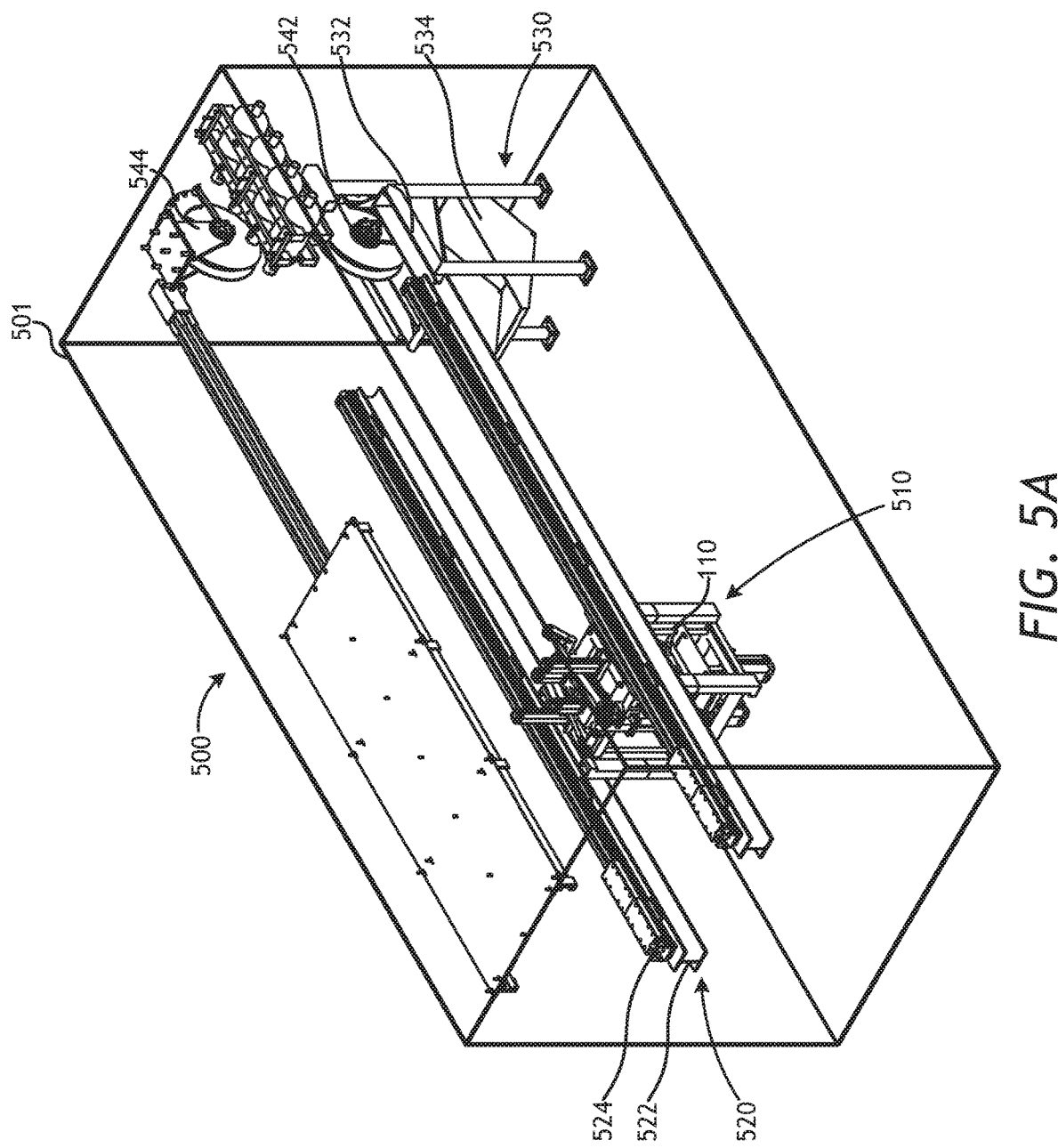
FIG. 5A is a perspective view diagram illustrating one embodiment of a node installation container comprising a node installation system.
Figure 5B:
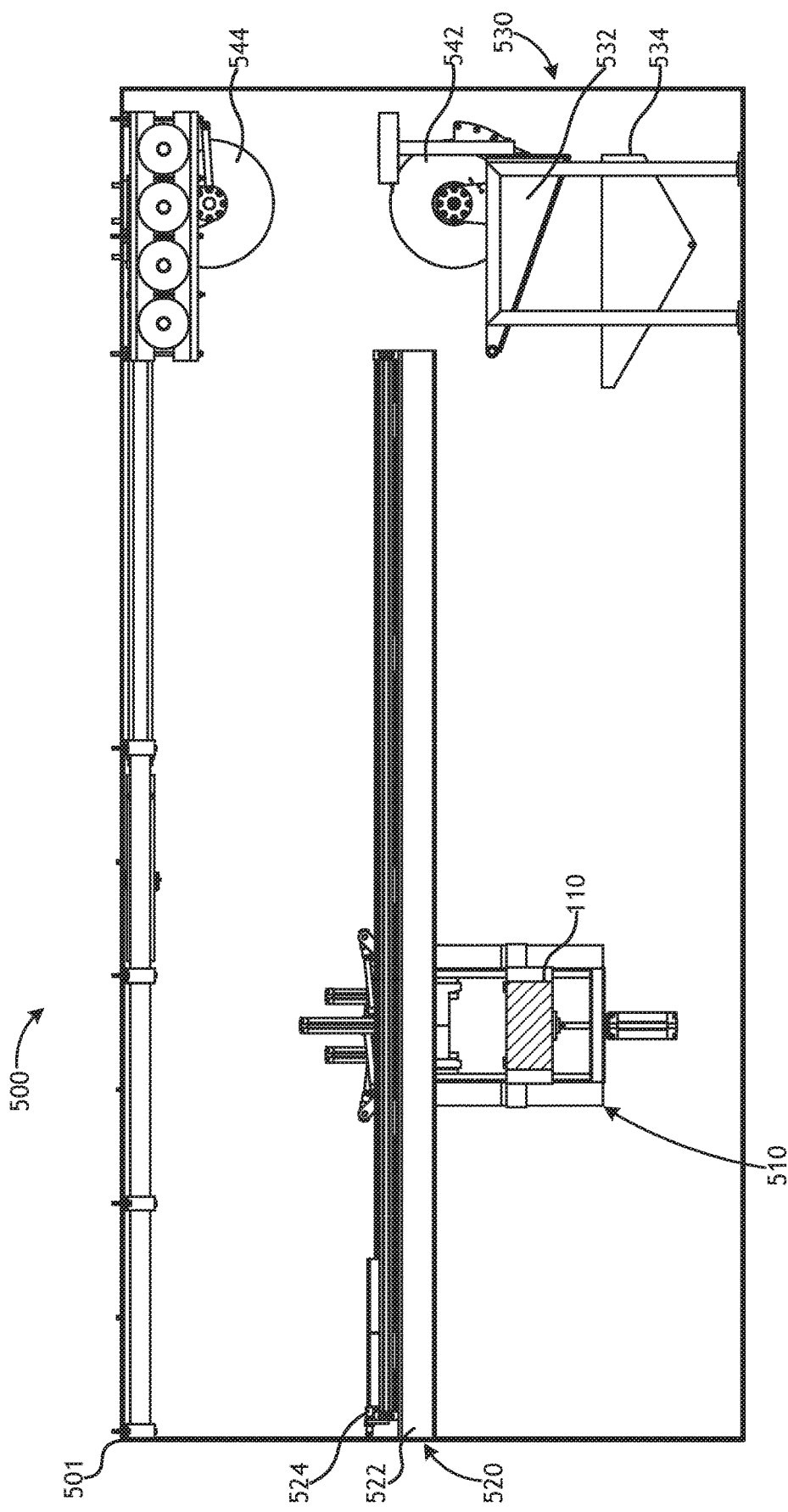
FIG. 5B is a side view diagram illustrating one embodiment of the node installation container of FIG. 5A.
Figure 5C:
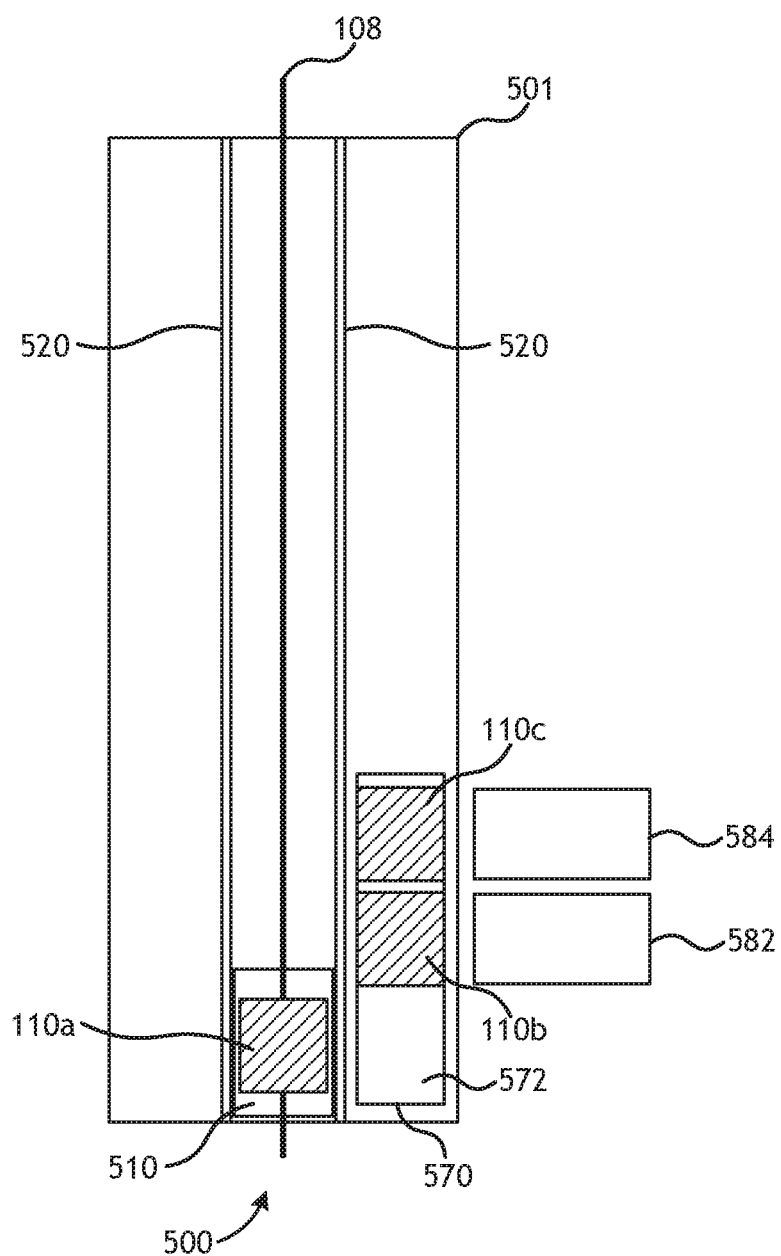
FIG. 5C is a top view diagram illustrating one embodiment of a node installation container comprising a node installation system.

FIGS. 5A-5C illustrate in more detail an embodiment of a node installation system 500. FIGS. 5A and 5B show a perspective and side view diagram, respectively, of a node installation system 510 within a node installation container 501. Node installation system 500 may comprise a node attachment device 510 (which also may be referred to as a node detachment device) that is coupled to lateral movement system 520. A plurality of sheaves 542 and 544 may be configured to route the deployment cable between the winch container system and the node installation container. Between the sheaves may be located a light curtain or other detection system (not shown) configured to provide an early indication of where the node placement position may be and to give notification to the node attachment device 510 to move into a ready position. In some embodiments, the node installation system 500 may comprise and/or be coupled to a control system and/or operator panel. A node removal station 530 may be located towards the front (bow) portion of the deployment system in container 501 between the node installation machine and the main winch container. Remover 530 acts as a safety device and is configured to forcibly remove a node from the deployment line if the node and/or node lock does not properly detach from the cable in the node detachment device 510 during retrieval of the cable after a seismic survey has been performed. Node removal station 530 comprises a node detachment plate 532 and a collector tray or bin 534 that receives the nodes once they drop from being decoupled and/or removed at the node detachment plate 532. In one embodiment node detachment plate 532 comprises an angled plate with an opening or slot approximate to sheave 542 and by leading the cable in one direction through the slot and the node in another direction (by contact with the plate) node remover 530 may pull the node off the cable by force.

Figure 10A:
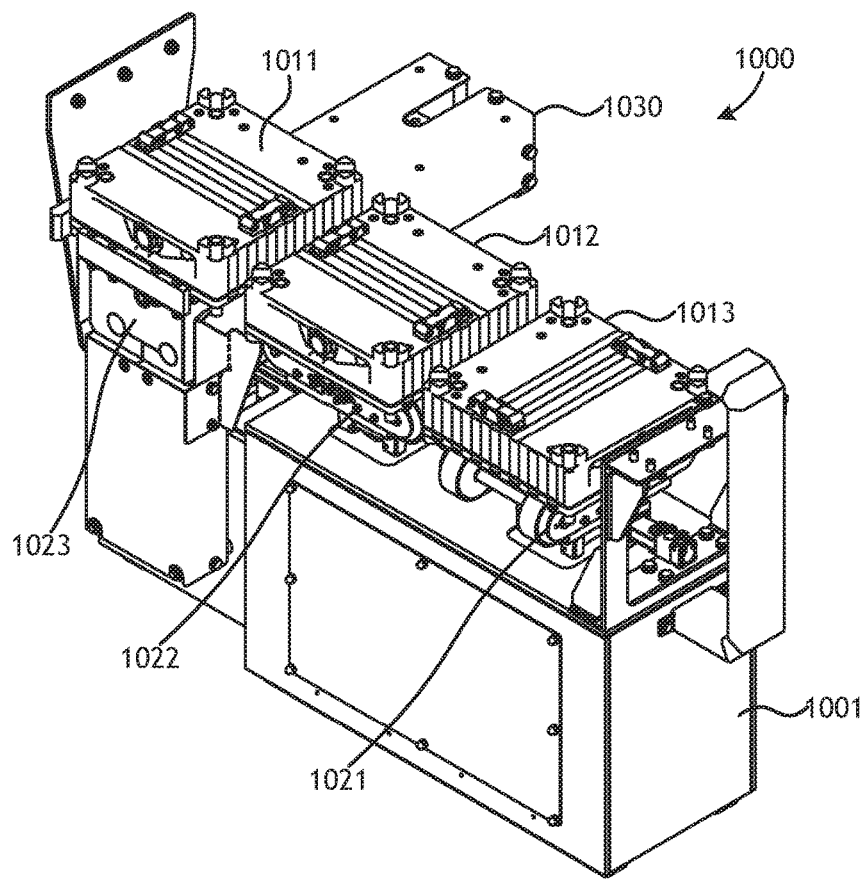
FIG. 10A is a perspective view diagram illustrating one embodiment of a node feeder system.
Figure 10B:
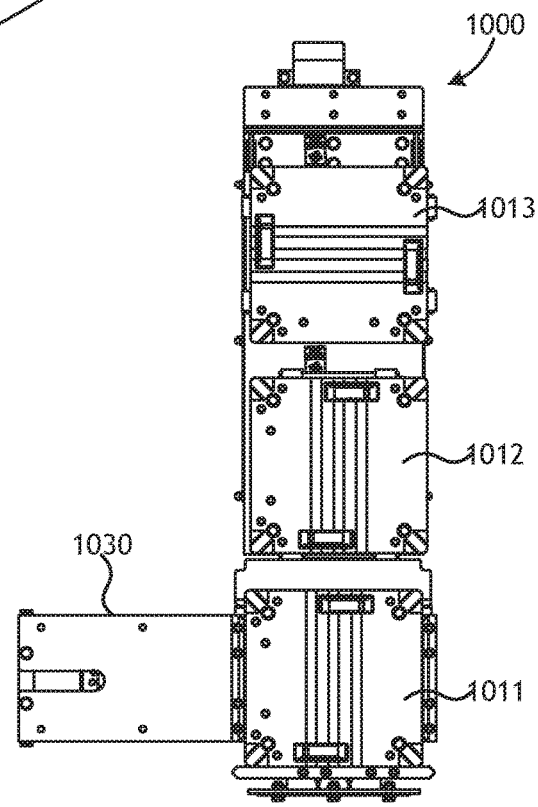
FIG. 10B is a top view diagram illustrating the node feeder system of FIG. 10A.
Figure 10C:
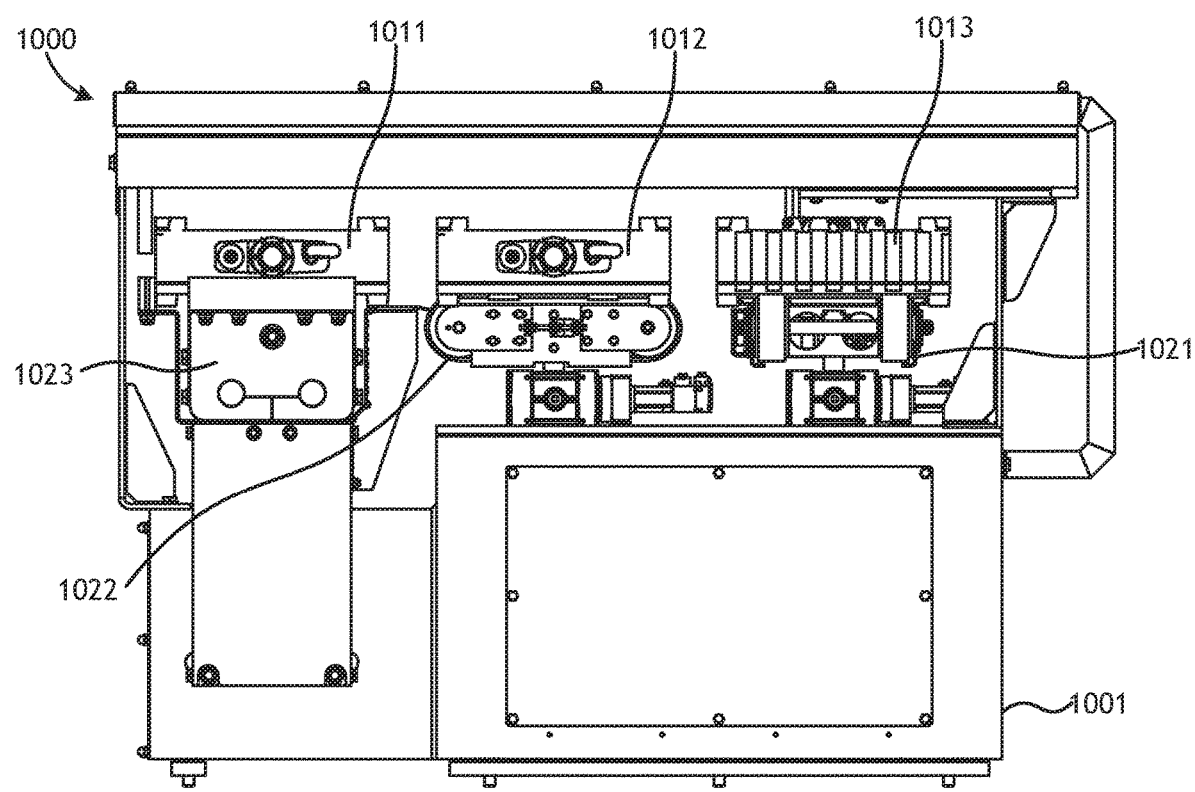
FIG. 10C is a side view diagram illustrating the node feeder system of FIG. 10A.

FIG. 5C is a top view diagram illustrating one embodiment of node installation system 500 in container 501. As shown in FIG. 5C, node installation system 500 is coupled to feed system 570, which is configured to transfer nodes between node storage and service system 310 and a node platform on the node installation machine 510. One or more conveyors (such as a conveyor belt system coupled to a plurality of rollers) 582, 584 may couple feed system 570 to node storage and service system 310. In one embodiment, conveyor 582 is configured to transfer nodes from the node storage and service system and conveyor 584 is configured to transfer transponders and/or other equipment from the node storage and service system. A plurality of nodes may be positioned on node feeder 570 prior to transfer to node installation machine 510. In one embodiment, node 110c is positioned on a first section of feeder system 570, node 110b is positioned on a second section of feeder system 570, and a third position 572 of the node feeder system is open, as the node feeder system had previously transferred node 110a to the node installation machine. In other embodiments, a transponder may be positioned on a first section of the node feeder system and a node may be positioned on a second section of the node feeder system. One embodiment of node feeder system 570 is illustrated FIGS. 10A-10C, which illustrate perspective, top, and side view diagrams, respectively, of a node feeder system 1000. As shown, a plurality of nodes 1011, 1012, and 1013 may be positioned on a top portion of feeder unit or frame 1001. One or more conveyors may be positioned on feeder frame 1001 to convey a plurality of nodes to and from the feeder system and within different positions of the feeder system. Such conveyors may be a single unit rotation device (comprising a rotation unit, a conveyor belt, and a plurality of rollers) that is configured to move the nodes 90 degrees to change a position and/or direction of the nodes, as described more fully in U.S. patent application Ser. No. 14/711,262, filed on May 13, 2015, incorporated herein by reference. For example, node 1011 is shown position in one direction and node 1012 is shown in a rotated position of approximately 90 degrees. Such conveyors may align the node in the correct orientation for attaching the node locks on the node to the cable. In one embodiment, conveyors 1021 and 1022 may each be positioned on a section of the feeder system to transfer nodes between conveyors 582 and 584 and the node feeder system. Conveyors 1021 and 1022 may also be configured to move nodes 1011 and 1012 onto a conveyor system 1023, which itself may be comprise and/or be coupled to node extension unit 1030. Node feeder system 570 may also comprise a node extension unit 1030 that is configured to transfer nodes to and from a node platform on the node installation machine 510. In one embodiment, node feeder system 570 is configured to move laterally and vertically in a variety of positions. In one embodiment, a node platform of the node installation device comprises a plurality of rails with a distance between the rails such that the node feeder system (with a width less than the distance between the rails) can transfer the nodes to and from the node platform by using a combination of vertical and lateral movements.

As shown in FIGS. 5A and 5B, lateral movement system 520 may comprise one or more frames or I-beams 522 coupled to the top and/or bottom of container 501 by a plurality of vertical supports (not shown). One or more sliding guides, tracks, rails, or cylinders 524 may be coupled to frame 522 and be configured to move node attachment device 510 backwards and forwards in a lateral motion within container 501. In one embodiment cylinders 524 may be a plurality of pneumatic rodless cylinders. The cylinders may comprise a plug or moving agent within the cylinders that is coupled to node installation machine 510 that moves back and forth within cylinders 524 based upon applied pneumatic pressure, thereby moving installation machine 510 laterally within container 501 and with the path of cable 108. One or more accumulators may be coupled to cylinders 524 to supply the required pressure to move node installation machine 510 along lateral movement system 520. Cylinders 524 may include lateral stops that prevent installation machine 510 from moving past a certain point in either direction. The node installation system is configured for (and the cylinder length is long enough) attachment/detachment of the node to the cable anywhere over the length of cylinders 524. This facilitates quick and easy attachment/as the cable and machine do not have to stop at one precise spot.

In one embodiment, node installation device 510 is configured to lock to the cable prior to, during, and/or after attachment/detachment of the node. In a fully automated system, rodless cylinders 524 may accelerate node installation device 510 before it couples to and/or locks onto the cable, thereby causing the carriage and the cable to have a synchronized speed. The cylinders are configured to accelerate the carriage (with the node onboard) to approximate the speed of the cable being deployed or retrieved. In one embodiment the speed of a cable may be approximately three knots (approximately 1.5 m/s) and the length of cylinders 524 approximately 5 meters, which may provide approximately 3 seconds of time for node attachment/detachment. The time it takes to attach or detach a node may range from approximately one to three seconds. In other instances, the deployment/retrieval speed of the cable may need to be stopped or slowed prior to attachment of node installation machine 510 to the cable. The node installation system 500 may include automatic, semi-automatic, or manual checks or indicators that verify whether the attachment/detachment was successful. In one embodiment, these checks may use output signals (visual or auditory) to notify the operator of an unsuccessful coupling/decoupling, and in other embodiments, the attaching or detaching process may automatically stop if an attachment or detachment was not successful.

The nodes can be attached to the cable at predetermined or variable locations. The cable may include markers, terminations, and/or ferrules at specific intervals and locations that may assist placement and attachment of the nodes on the cable. In a further embodiment, a reference marker on specified intervals of the deployment line, such as colored/painted markers, magnetic paint, or any low profile marking system such as heat shrink, may be used to align the deployment line with the appropriate portions of the coupling to facilitate attachment of the node to the cable. In one embodiment, the nodes may be attached approximately every 25 meters along the cable between a pair of ferrules previously attached to the cable. The distance between the two ferrules may be 5-15 centimeters longer than the actual node length, which provides the node freedom to move longitudinally along the cable between the ferrules. In one embodiment, the ferrules are attached to the cable by a process known as swaging. Node-locks and/or attachment mechanisms may encircle the cable but may not tightly clamp to or grip the cable to allow the node freedom to swivel around the cable and to move longitudinally along the cable between the position stoppers and/or ferrules.

In one embodiment, node installation system 500 comprises a cable detection and/or sensing mechanism and a positioning mechanism, which may or may not be the same device. In one embodiment, such mechanisms are located on node installation machine 510. Node installation system 500 is configured to accelerate to and move with the speed of the cable for attachment/detachment of a node, and the system is configured to detect a position on the cable for such movement. In one embodiment, node installation system 500 detects the position of a node (whether for attachment or detachment) by detecting one or more ferrules or stoppers coupled to the cable. In some embodiments, node installation system 500 is configured to couple to and/or grab the cable during attachment/detachment. In some embodiments, node installation machine 510 is configured to attach a node to each of the pairs of spaced apart ferrules, and in other embodiments node installation machine 510 may be programmed to skip various positions if longer distances between a node is intended. For example, rather than coupling a pair of ferrules along the cable at approximately every 25 meters, a pair of ferrules may be placed every 12.5 meters and/or 6.25 meters, with a distance between each pair of ferrules being a potential node attachment point and/or position. Based upon the particular survey, an autonomous seismic node may be attached to the cable at every 6.25 meters, 12.5 meters, 25 meters, or various combinations/manipulations of the above. In one embodiment, transponders or other devices may be coupled to the cable in a similar fashion at variable distances between the autonomous nodes. With a control system and various operating parameters combined with the disclosed node installation machine, any number of survey requirements can be easily and automatically programmed for the node installation system.

Compared to conventional node attachment techniques, the direct attachment apparatuses and methods described herein provide numerous benefits. The disclosed embodiment provides for high-speed, autonomous, and variable attachment and detachment to the deployment line with limited operator involvement. Among other benefits, the discloses system provides the ability to change quickly the distance/spacing between the nodes on the deployment line without having to rebuild all or parts of the deployment line. Because the system is utilized within a container and may be performed automatically and semi-automatically, the deployment and retrieval of a cable can be done with limited operator involvement and in harsh sea conditions in which deployment/retrieval operations were previously not possible. Such a deployment and/or attachment system increases the overall safety, efficiency, and reliability of the seismic survey.

Node Installation Device

Figure 6A:
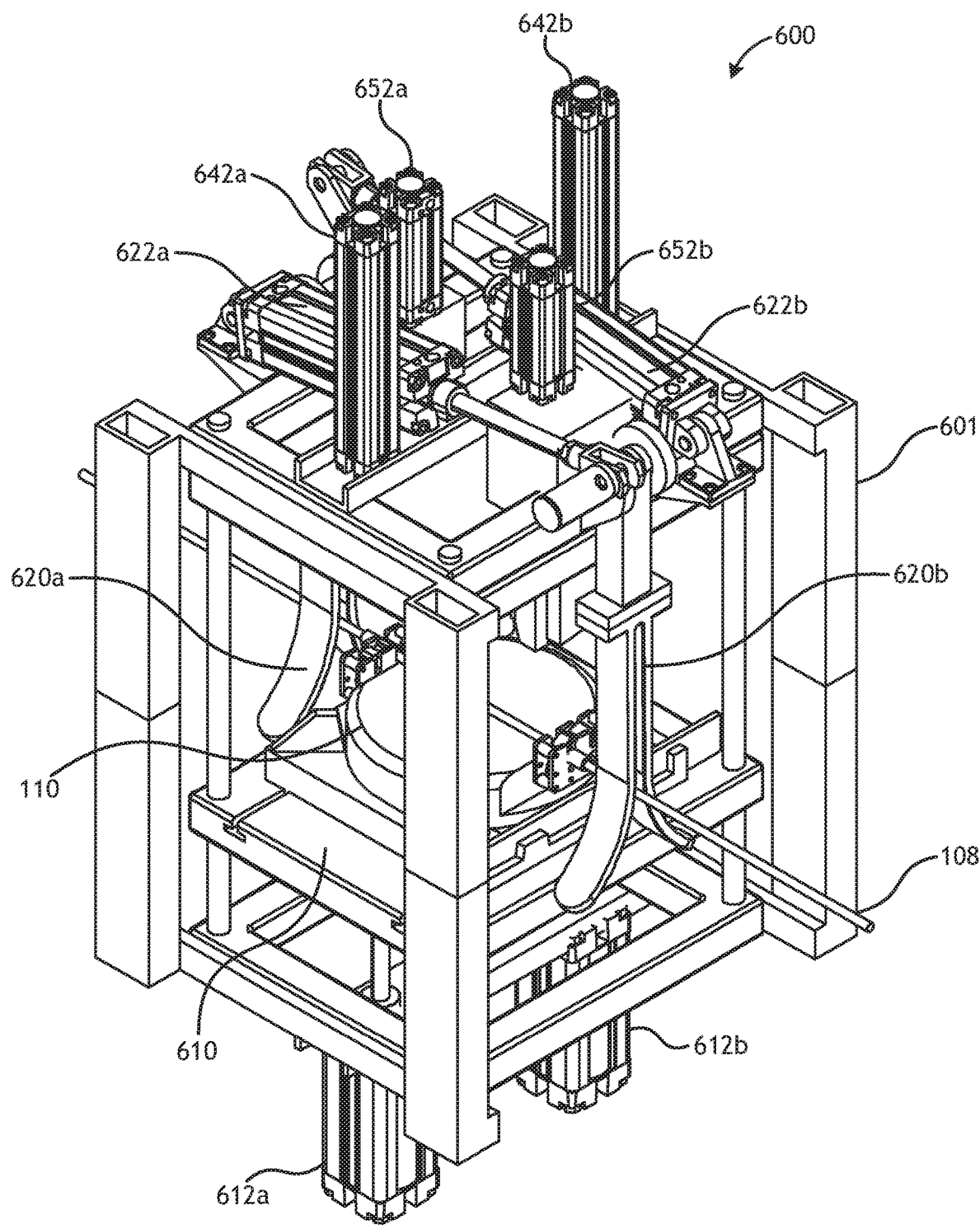
FIG. 6A is a perspective view diagram illustrating one embodiment of a node installation device.
Figure 6B:
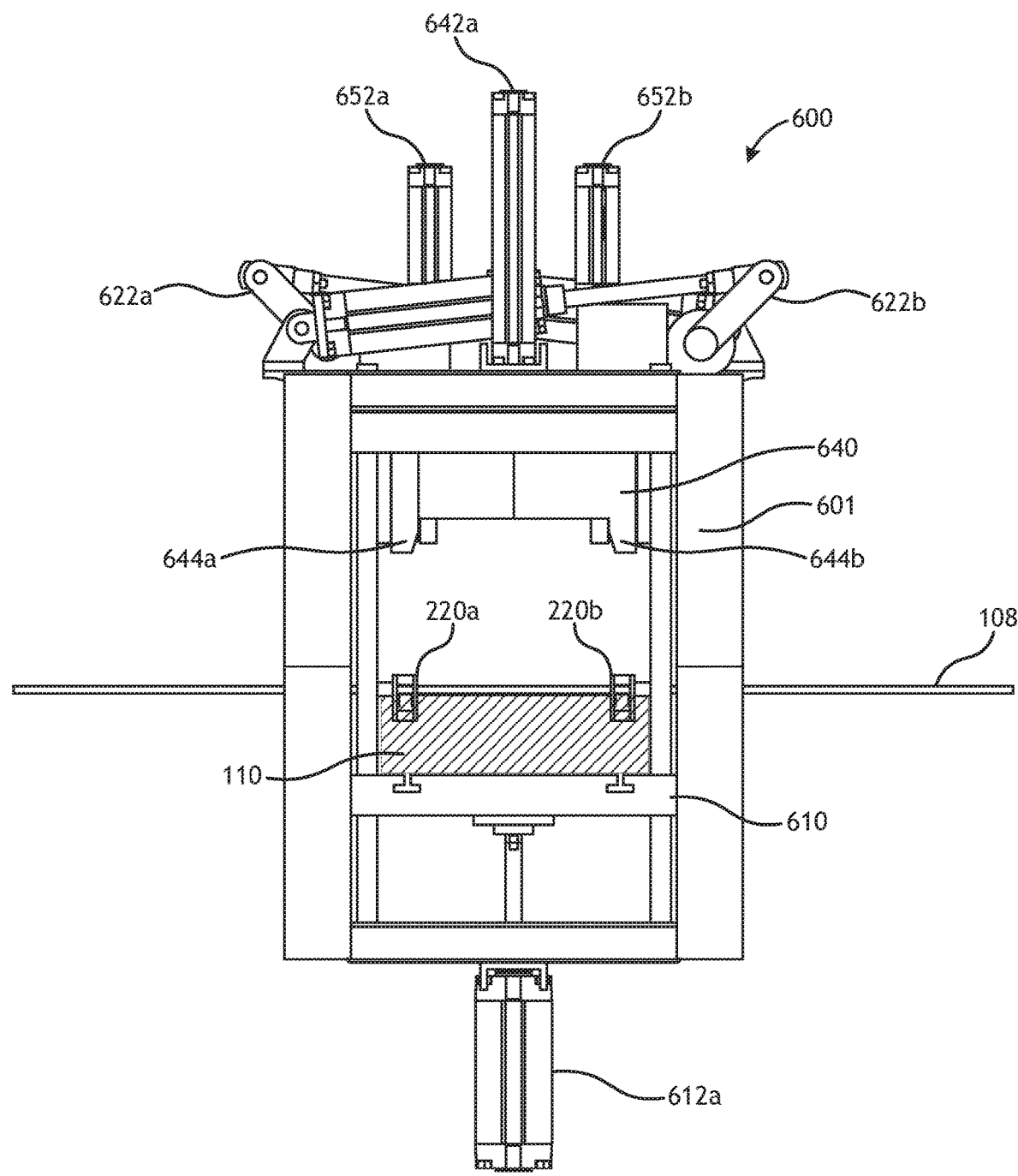
FIG. 6B is a side view diagram illustrating the node installation device of FIG. 6A.
Figure 6C:
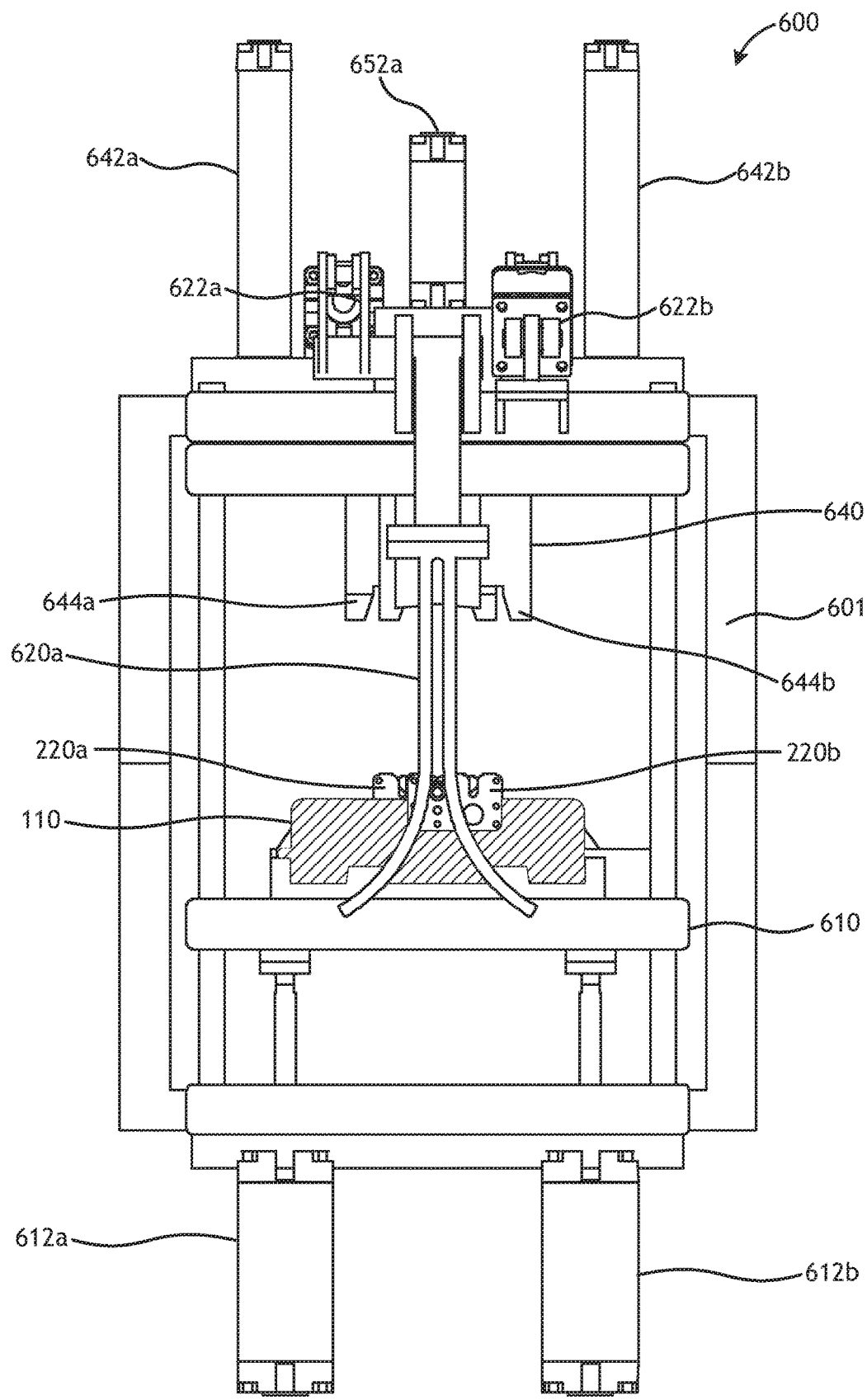
FIG. 6C is a front view diagram illustrating the node installation device of FIG. 6A.

One embodiment of node installation device 510 is shown in more detail in FIGS. 6A-6C, which illustrate a perspective, side, and front view diagram respectively of a node installation device 600. The configuration of node installation machine 600 varies based upon the specific configurations of the node locks and/or direct attachment mechanisms present on the node. In one embodiment it may be considered a node carrier or other conveyance structure. Node installation machine 600 may comprise a node platform or cradle 610, an upper plate 640, one or more positioning devices 620, one or more contact points 644 configured to actuate the node locks, and one or more cylinders 652 configured to push the deployment line into the node locks. Frame 601 couples the various components of the node installation machine together and may be coupled to lateral movement system 520 (see FIGS. 5A-5C). In FIG. 6B, node 110 comprises a plurality of node locks 220a, 220b and is resting on platform 610.

Node platform 610 is sized and configured to hold a node prior to, during, and/or after attachment to the cable. In some embodiments, platform 610 is configured to transfer nodes to and from node feeder system 570 (shown in FIGS. 5C and 10A-10C). Node platform rests on and/or is coupled to an elevator mechanism 612 and in one embodiment comprises a plurality of vertically movable cylinders 612a, 612b, which may be hydraulic or pneumatic. The elevator mechanism 612 is configured to move node 110 to the appropriate vertical height and/or position for attaching/detaching and/or coupling/decoupling the one or more node locks and/or node to the cable.

Upper plate 640 is coupled to elevator mechanism 642, which may comprise a plurality of vertically movable cylinders 642a, 642b, which may be hydraulic or pneumatic. Elevator mechanism 642 may be configured to move upper plate 640 into close proximity to the node and/or node locks. In one embodiment a lower section of upper plate 640 is coupled to one or more contact points 644a, 644b such that contact points 644a, 644b may engage node locks 220a, 220b when upper plate 640 is lowered. Thus, contact points 644a, 644b act as actuating devices for the node locks and when lowered enough may depress a latch on the node lock to move it from a closed position to an open position. Contact points 644a, 644b may be tapered, grooved, or flat, as well as any other configuration depending on the particular shape of the node lock. Similarly, in other embodiments an attachment/detachment tool such as a roller (such as roller 234 in FIG. 2D) or one or more cylinders (such as rod/cylinder 244 in FIG. 2E) may be used to contact one or more node locks and move them between an open/closed and/or locked/unlocked position. These other actuating devices may or may not be coupled to upper plate 640. In some embodiments, upper plate 640 may be lowered to force the cable into engagement with the node locks. In other embodiments, upper plate 640 is coupled to one or more cylinders 652a, 652b which are configured to push the cable into engagement with the node locks. In this embodiment, upper plate 640 is lowered enough to depress the node locks with one or more contact points 644a, 644b. Once the node locks are opened, one or more cylinders 652a, 652b are further lowered to push the cable into the node locks. While cylinders 652a, 652b keep the cable in a lowered position, upper plate 640 raises along with contact points 644a, 644b, thereby moving the node locks from an open position to a closed position around the cable. Cylinders 652a, 652b can subsequently be raised.

In one embodiment, positioning device 620 is configured to detect a node placement position, which in one embodiment is the space on the cable between a plurality of spaced apart ferrules. In some embodiments, only a single marker, detection point, and/or ferrule may indicate a node placement position on the cable. In other embodiments, positioning device 620 may also be configured to couple to and/or grab a length of the cable, for example by grabbing or locking onto one or more ferrules coupled to the cable. Positioning device 620 may be used in deployment operations to indicate to the node attachment/detachment machine where a node should be coupled to the cable as well as in retrieval operations to indicate to the node attachment/detachment machine where a node should be removed from the cable. In one embodiment, positioning device 620 comprises a plurality of forks with a plurality of coupled arms that act as a ferrule and/or marker detector and a cable engager. Each positioning device 620a, 620b may be coupled to a hydraulic plunger or cylinder 622a, 622b for movement from a first or raised/disengaged position to a second or lowered/engaged position with respect to the cable. The positioning devices may be moved vertically from a first position to a second position or may be rotated or hinged in a radial sweep approximately 45 to 90 degrees longitudinally from its lowered position.

Figure 7A:
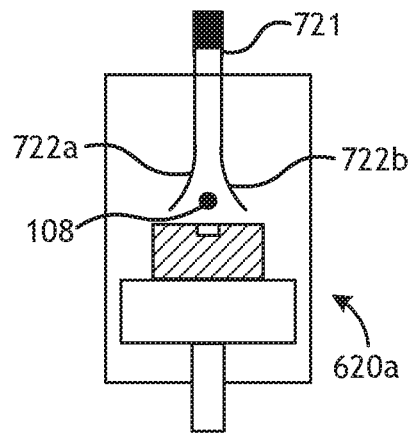
FIGS. 7A-7D are side view diagrams illustrating various embodiment of a node installation device in multiple positions.
Figure 7B:
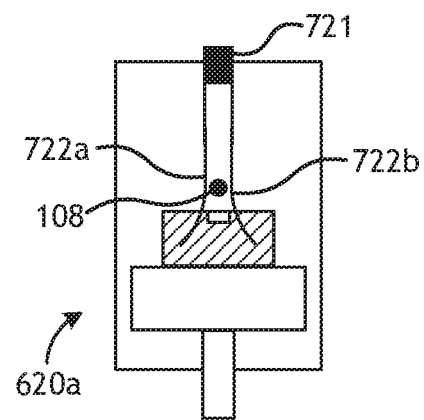
Figure 7C:
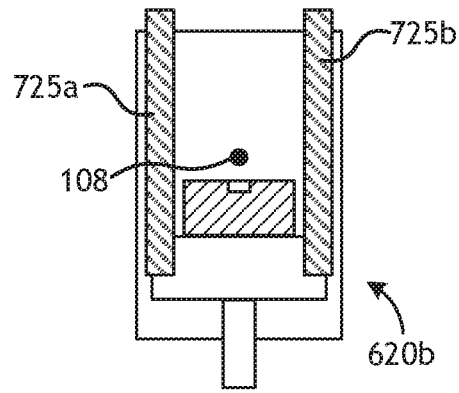
Figure 7D:
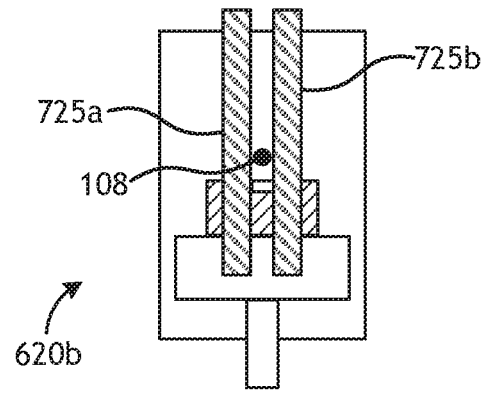

Various embodiments of a mechanical positioning device 620 are illustrated in FIGS. 7A-7D in various operating positions. FIGS. 7A-7B illustrate positioning device 620a comprising a fork with a plurality of coupled arms 722a, 722b, similar to the embodiment described in FIGS. 6A-6C. Each arm 722a, 722b comprises an upper section that is substantially straight and a lower section that is outwardly curved so as to create an opening between the arms to receive the deployment line and/or ferrule coupled to the deployment line. The arms may be attached together at upper portion 721. The fork may be lowered and/or raised in a vertical direction (and in other embodiments raised via a hinge) to make contact, engage, and/or grab the cable and/or ferrule. FIG. 7A shows the fork in an upper or disengaged position, and FIG. 7B shows the fork in a lower or engaged position. FIGS. 7C-7D illustrate positioning device 620b comprising a plurality of vertical arms or rods 725a, 725b that may be spaced apart. Arms 725a, 725b may be moved horizontally to make contact, engage, and/or grab the cable and/or ferrule. FIG. 7C shows the arms in a separated, retracted, or disengaged position, and FIG. 7D shows the arms in a coupled or engaged position to the cable.

In one embodiment, node detection device 620 is coupled to the cable and/or ferrule by friction. In other embodiments a portion of the positioning device (such as a lower section of the arm) is positioned adjacent to or approximate with the cable (see, e.g., FIGS. 7B, 7D) such that as the cable passes through the detection device 620, a coupled ferrule contacts, hits, and/or engages the arm. The node installation machine 600 is configured to detect this contact and upon contact of positioning device 620 with the cable, node installation machine 600 is configured to accelerate to and/or maintain the speed of the cable (whether the cable is being deployed or retrieved). Other embodiments of positioning device 620 are possible and depend upon the type of marker used on the cable. For example, the intended node position and/or placement can be detected by optics, magnetic sensor, and other cable positioning measurements that do not require mechanical motion by the detection device 620.

In some embodiments, a control system may be programmed to stop and alert the operator that a node has not gripped firmly around the cable. The operator may then acknowledge the warning and continue with the deployment process and/or stop the deployment and manually remove the node and couple a new node in its place. Various embodiments exist that may be used to detect node attachment issues, including light-curtains. In one embodiment, light curtains are opto-electronic devices that use a plurality of lasers to detect small movements within the sensitivity range of the light curtain by projecting an array of parallel infrared light beams from one or more transmitters to one or more receivers. When an object breaks one or more of the beams a signal is sent to the device. In one embodiment light curtains act as safety devices, and a control system may be configured to stop a particular device and/or deployment system when the light curtain is triggered. By reducing the need for physical guards and barriers, light curtains can increase the maintainability of the equipment they are guarding. The operability and efficiency of machinery can also be improved by the use of light curtains by, for example, allowing easier access for semi-automatic procedures.

FIGS. 8A-8G show various side view schematics of a node installation device attaching a node to a deployment line. FIGS. 8H-8N show various side view schematics of a node installation device detaching a node from a deployment line. While the components shown in FIGS. 8B-8G and 8I-8N are the same as those shown in FIGS. 8A and 8H, such figures are not provided with reference numbers for simplicity purposes.

FIGS. 8A and 8H are side view diagrams illustrating one embodiment of a node installation device 800, which may be substantially similar to node installation devices 510 and 600. As shown in FIGS. 8A and 8H, node installation device 800 comprises a carrier frame 801 coupled to a plurality of detection devices or forks 820a, 820b that may be raised or lowered to contact deployment cable 108 and/or pre-coupled ferrules. FIG. 8A shows node 110 resting on platform 810 that is vertically movable by elevator mechanism or cylinder 812. FIG. 8B shows node 110 coupled to deployment line 108 prior to entry into installation device 800. Upper plate 840 is vertically moveable by an elevator mechanism or one or more cylinders (not shown), such as cylinders 642a, 642b in FIGS. 6A-6C. A plurality of actuators or contact points 844a, 844b are coupled to a lower portion of upper plate 840, and thereby may be vertically moveable and lowered into a contact and/or actuating position with a plurality of node locks on seismic node 110 by movement of upper plate 840. In other embodiments, contact points 844a, 844b may be raised and lowered by separate cylinders and thus moved separately from upper plate 840. Push cylinder 842 may be coupled to upper plate 840 and is configured to push deployment line 108 into contact with the node locks after the contact points 844a, 844b have moved the node locks into an open position. In other embodiments, a plurality of cylinders (such as 652a, 652b in FIGS. 6A-6C) may be used to push the wire into the node locks. In one embodiment, a first fork 820a is placed on a first end of the machine and a second fork 820b is placed on a second and opposing end of the machine. FIGS. 8B-8G are side view diagrams illustrating one embodiment of a node installation device 800 in multiple operating positions in a deployment operation. FIGS. 8I-8N are side view diagrams illustrating one embodiment of a node installation device 800 in multiple operating positions in a retrieval operation.

In a deployment operation, seismic node 110 is delivered and/or conveyed to node platform 810, as indicated in FIG. 8A. The cable in a deployment mode moves in a direction from the bow to the stern of the vessel, as indicated by the arrow above FIGS. 8B-G. As shown in FIG. 8B, second fork 820b is lowered to detect the next ferrule (or other markers) on the cable as the cable moves through node installation device 800 from the left to right direction (e.g., towards the stern). When a ferrule on the cable contacts second fork 820b, the force of the deployed cable may act on the node installation machine to help accelerate the node installation machine in conjunction with the lateral movement system 520 to a speed approximate to the deployment speed of the cable. When a ferrule is detected, first fork 820a may be lowered such that both forks may engage the cable to couple and/or fix carriage frame 801 to the cable, as shown in FIG. 8C. At or near the same time, node platform 810 elevates the node to a position proximate to the cable and upper plate 840 is lowered to a position proximate to the cable, as shown in FIG. 8D. In some embodiments, rather than using an attachment/detachment tool, the upwards vertical movement of the node may automatically engage the node locks to the cable and/or the cable may be physically forced into the attachment mechanism (such as by pushing) for locking the deployment cable to the node lock. In one embodiment, upper plate 840 may be lowered such that contact points 844a, 844b contact, engage, and/or actuate the node locks on the node, thereby moving them into an open position, as shown in 8D. Once the node locks are in an open position, one or more cylinders or cable pushers 842 may be lowered to push the cable into the node locks, as shown in FIG. 8E. While cable pusher 842 keeps the cable coupled to the node locks, upper plate 840 and/or contact points 844a, 844b are raised to move the node locks from an open position to a closed position, as shown in FIG. 8F. At the same time (or subsequent to the raising of cable pusher 842) node platform 810 may be lowered away from the node. Once the node locks are in a closed position about the deployment line, cable pusher 842 may be raised along with upper plate 840, as shown in FIG. 8G. At or near the same time, the plurality of forks or detection devices 820a, 820b release the cable so that the cable and coupled node may pass through the node installation machine. The node installation may then return to an initial or starting position to receive the next node. A second node is delivered to node platform 810 and the above steps are repeated until the desired number of nodes are attached to the cable.

The retrieval operation (once the seismic survey has been completed and the nodes are to be retrieved) acts in a similar fashion as the deployment operation, only in a reverse/opposite procedure. In a retrieval operation, seismic node 110 is delivered and/or conveyed towards node installation machine 800, as indicated in FIG. 8H. The cable in a retrieval mode moves in a direction from the stern to the bow of the vessel, as indicated by the arrow above FIGS. 8I-N (from the right to left direction). In one embodiment, a node is routed through installation machine 800 prior to detector device 820a lowering into a detect position, as shown in FIG. 8I. In other embodiments, as shown in FIG. 8J, first fork 820a is lowered to detect the next ferrule (or other markers) on the cable prior to the node passing through node installation device 800. When a ferrule on the cable contacts first fork 820a, the force of the retrieved cable may act on the node installation machine to help accelerate the node installation machine in conjunction with the lateral movement system 520 to a speed approximate to the retrieval speed of the cable. Once the coupled node is within node installation machine 510, second fork 820b may be lowered such that both forks may engage the cable to couple and/or fix the carriage frame 801 to the cable, as shown in FIG. 8K. At or near the same time, node platform 810 is elevated to a position proximate to the node and upper plate 840 is lowered to a position proximate to the cable. In one embodiment, upper plate 840 may be lowered such that contact points 844a, 844b contact, engage, and/or actuate the node locks on the node, thereby moving them into an open position, as shown in 8L. Node platform may be further positioned into a close proximity to the node. In one embodiment, opening of the node locks releases, detaches, and/or decouples the node from the cable, at which point the node may drop down to node platform 810, as shown in FIG. 8M. In other embodiments, node platform 810 may be further raised to contact and/or receive the node prior to it being dropped to facilitate decoupling of the node from the cable. At or near the same time, node platform 810 may be lowered away from the node. Once the node is decoupled from the cable, node platform 810 and upper plate 840 may be moved further away from the cable and the plurality of forks or detection devices 820a, 820b may release the cable so that the cable may pass through the node installation machine, as shown in FIG. 8N. The node installation machine may then return to an initial or starting position for receiving the next node. The above steps are repeated until the desired number of nodes are decoupled from the cable.

Figure 9A:
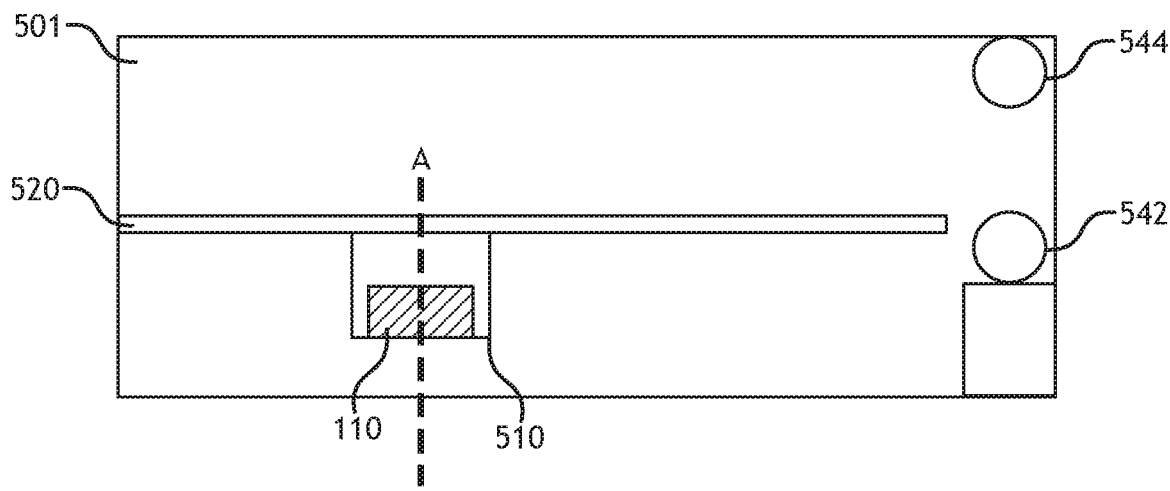
FIGS. 9A-9C are side view diagrams illustrating one embodiment of a node installation container with a node installation system in multiple operating positions within a node installation container.
Figure 9B:
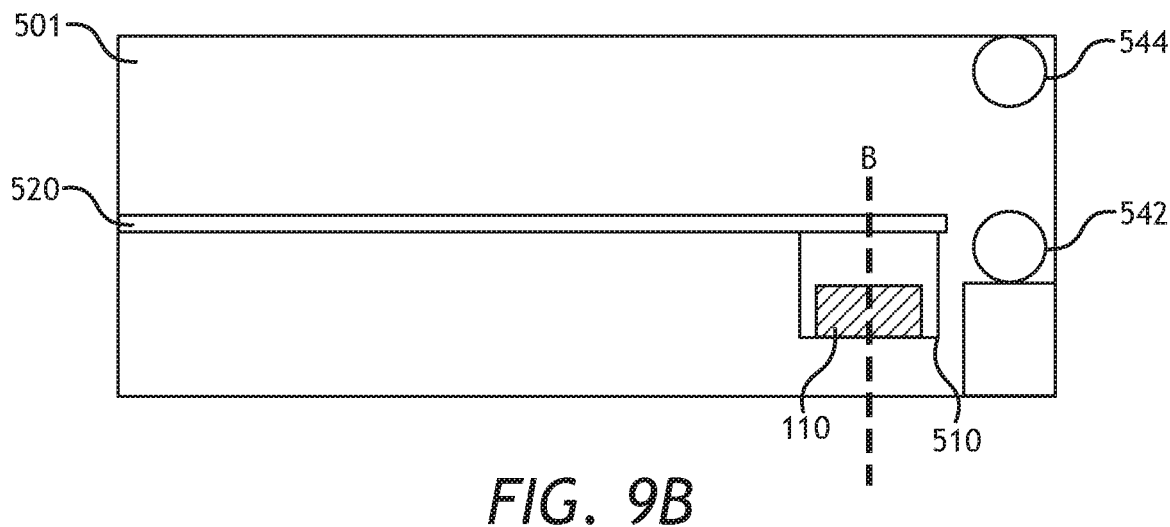
Figure 9C:
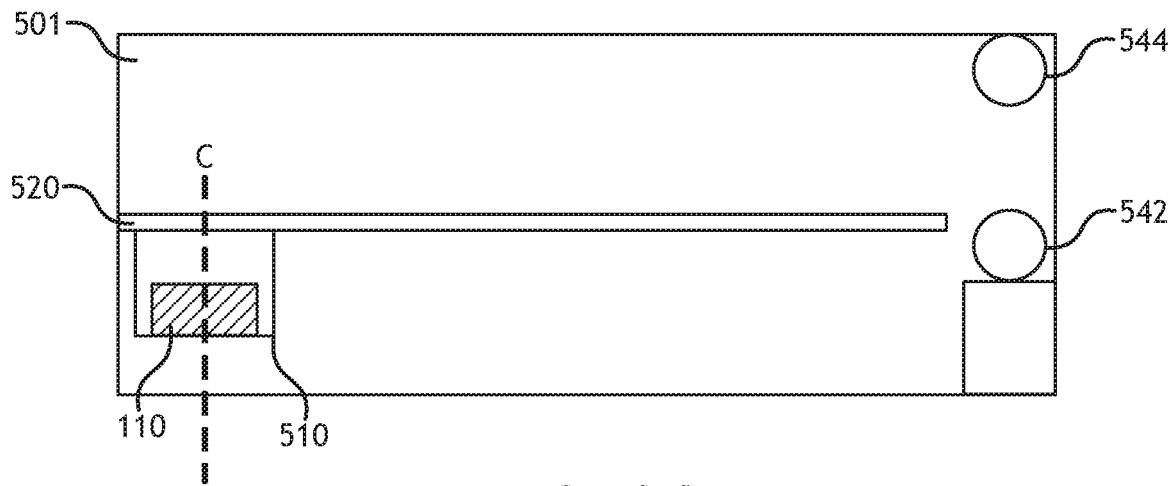

FIGS. 9A-9C are side view diagrams illustrating one embodiment of a node installation device 510 in multiple deployment positions throughout a node installation container 501. For simplification, deployment cable 108 is not shown and portions of node installation device 510 are not shown. Node installation device 510 moves in a horizontal or longitudinal direction with the path of the deployment cable based on lateral movement system 520. FIG. 9A shows node installation device 510 in a first position A, which is near the middle of the travel path along lateral movement system 520. FIG. 9B shows node installation device 510 in a second position B, which is near the forward (bow) section of the node installation container 501 and/or travel path along lateral movement system 520. FIG. 9C shows node installation device 510 in a third position C, which is near the rear (stern) section of the node installation container 501 and/or travel path along lateral movement system 520. Each position within the cable path (such as positions A, B, or C, or still others) may be the position in which the node installation device 510 transfers nodes to and from the node storage and service system via feeder system 570. Further, each position within the cable path (such as positions A, B, or C, or still others) may be the position in which the node installation device 510 attaches a node 110 to the cable and/or detaches a node 110 from the cable. In one embodiment for a deployment operation, after receiving the node installation device 510 moves laterally to position B (see, e.g., FIG. 9B), which provides the node installation device the most time to couple a node to the cable as the cable moves from the front to the back of the node installation container. Once node installation machine 510 detects the node placement position on the cable (such as by one or more ferrules), it laterally moves with the cable until the node is coupled to the cable, which may be a position C (see, e.g., FIG. 9C). The node installation machine then is configured to return to an initial position (such as position A) to receive the next node. In a retrieval operation, the node installation machine generally operates in an opposite or reverse manner as to the deployment operation. In one embodiment, node installation machine 510 starts at position C without a node, which provides the node installation device the most time to decouple a node from the cable as the cable moves from the back to the front of the node installation container. Once the node installation machine 510 detects the node placement position on the cable (such as by one or more ferrules), it laterally moves with the cable until the node is de-coupled to the cable, which may be a position B. The node installation machine then is configured to return to a node transfer position (such as position A) to transfer the removed node to feeder system 570. The node installation machine then is configured to return to an initial position (such as position C) to decouple the next node from the cable.

Figure 11:
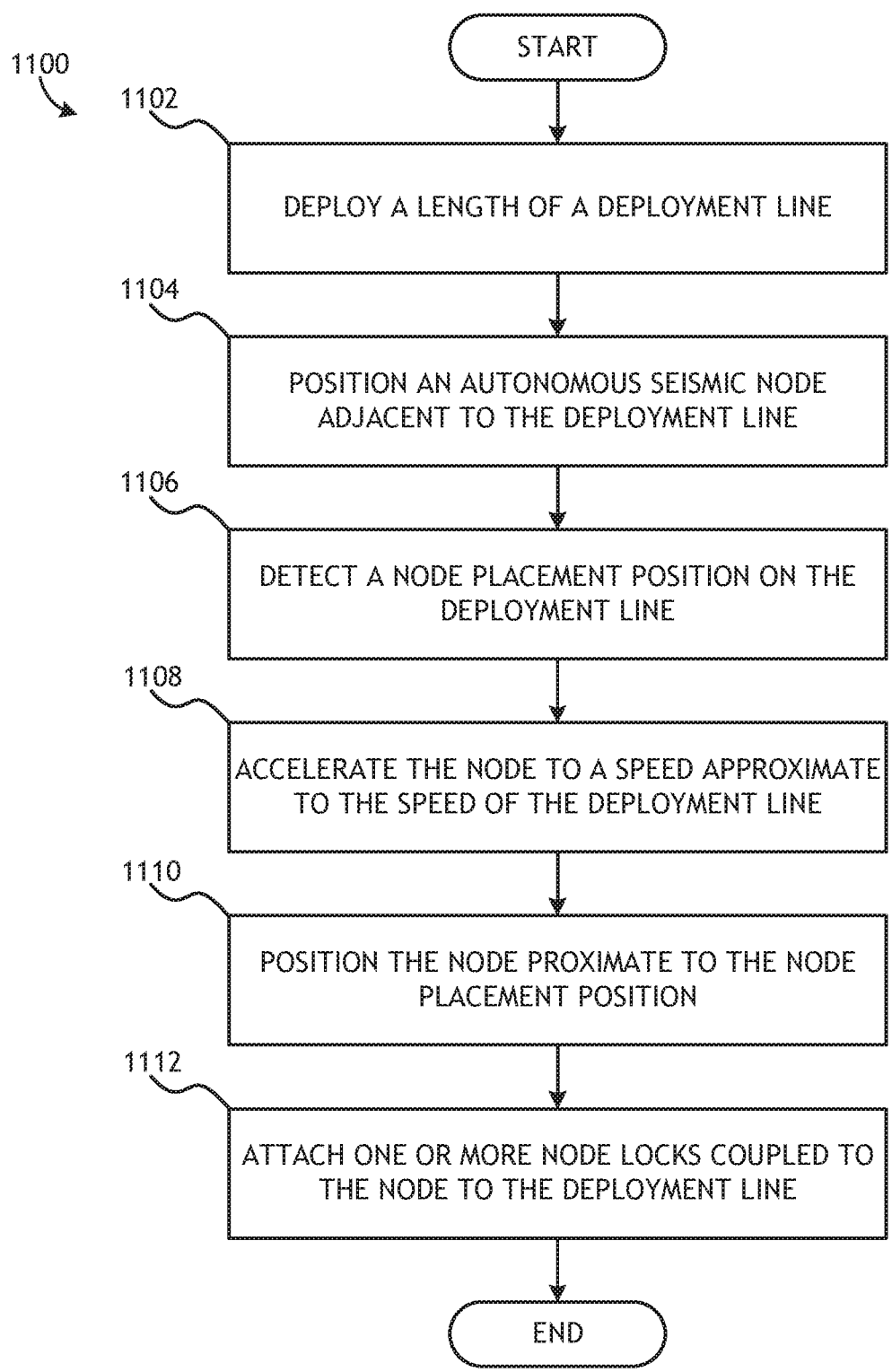
FIG. 11 illustrates one embodiment of a method of attaching a plurality of seismic nodes to a deployment line.

FIG. 11 illustrates one embodiment of a method 1100 for attaching an autonomous seismic node to a deployment line. In an embodiment, the method starts at block 1102 by deploying a length of a deployment line 108 from a marine vessel. At block 1104, the method includes positioning an autonomous seismic node adjacent to the deployment line. In one embodiment the positioning step comprises moving the node to a node installation machine that surrounds the cable and/or moving the node installation machine (while holding a node) to an initial position along the cable path. At block 1106, the method includes detecting a node placement position on the deployment line. In one embodiment, the node placement position is the space between a plurality of spaced apart ferrules that are pre-coupled to the cable. In one embodiment, the node placement position is determined by a light curtain and/or other mechanism or system configured to detect a ferrule or other marker on the cable. In addition to and/or in other embodiments, one or more forks or arms of a node installation machine are positioned next to the cable and detect when a ferrule passes through the node installation machine. At block 1108, the method includes accelerating the node to a speed approximate to the speed of the deployment line. In one embodiment, this step comprises accelerating a node installation machine to the speed of the cable. In other embodiments, the deployment line is slowed and/or stopped prior to node attachment. At block 1110, the method includes positioning the node proximate to the node placement position and/or a particular length or attachment point of the deployment cable, which may be based upon the detecting step in block 1106. In one embodiment, the positioning step comprises moving the node vertically and/or horizontally within a node installation machine such that one or more node locks on the node are proximate to the cable. At block 1112, the method includes attaching one or more node locks or direct attachment mechanisms coupled to the node to the deployment line. In some embodiments, the direct attachment mechanism needs to be opened or unlocked prior to receiving the deployment line, and in other embodiments, the direct attachment mechanism is already unlocked and/or is biased in an open position. In some embodiments, an attachment tool is used to actuate the locking mechanism from a closed to open position. In other embodiments, the deployment line is pushed into engagement with the node locks to move them from a closed to open position. In still other embodiments, the deployment line is pushed into the node locks and then the node locks are moved into a closed position. This process is repeated until the desired number of seismic nodes is attached to the deployment line. In one embodiment, each of these steps is performed automatically, while in other embodiments the positioning and attaching steps may be performed by manual or semi-automatic methods The rate of deployment can be varied and/or stopped as needed and is controlled by a master control system that is integrated with the primary components of the node deployment system and node installation system.

Figure 12:
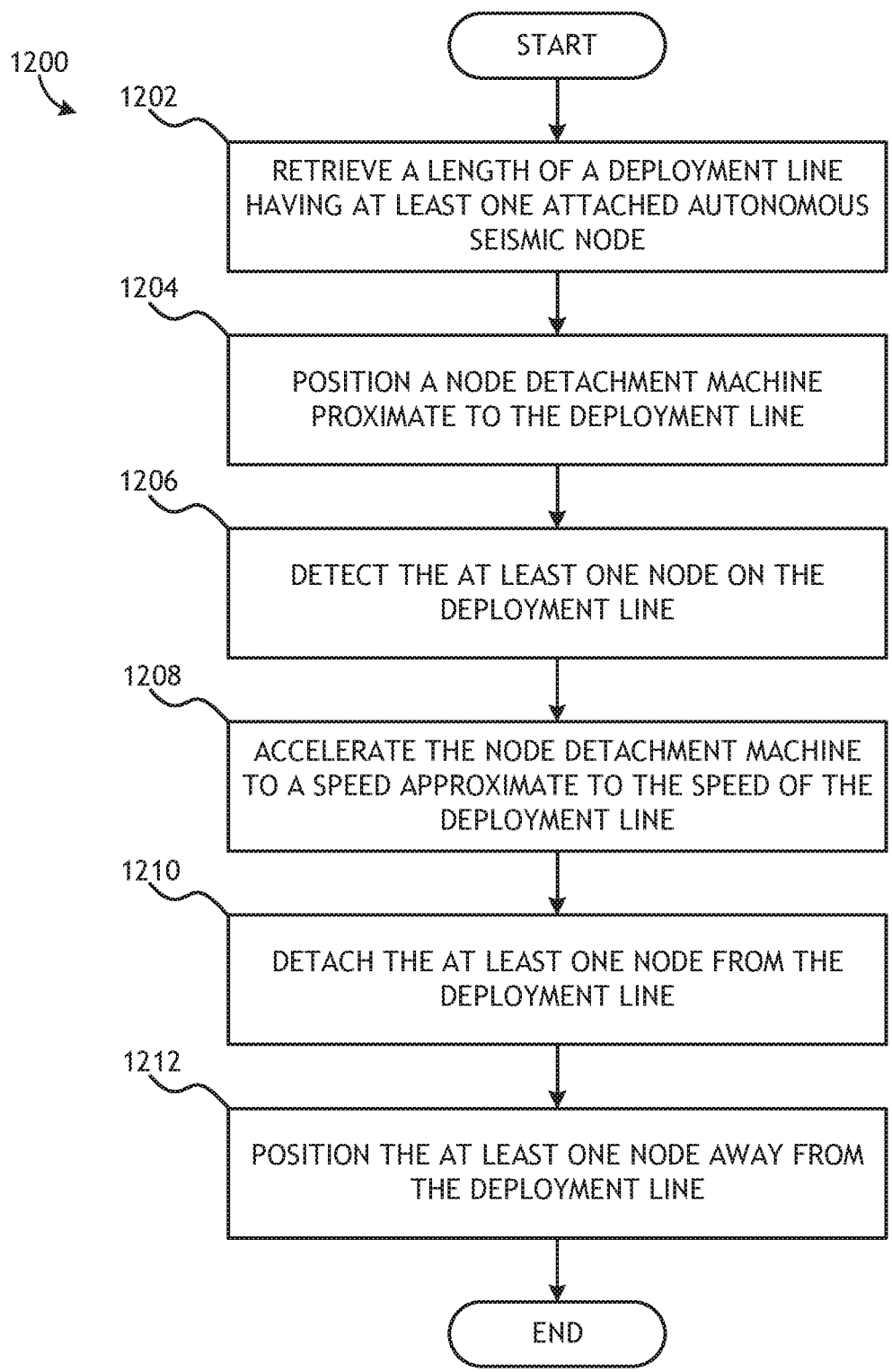
FIG. 12 illustrates one embodiment of a method of detaching a plurality of seismic nodes attached to a deployment line.

FIG. 12 illustrates one embodiment of a method 1200 for detaching an autonomous seismic node 110 from a deployment line 108. In an embodiment, the method starts at block 1202 with retrieving a length of deployment line 108, the deployment line 108 having at least one attached seismic node 110. The attached seismic node may be attached directly to the deployment line with at least one direct attachment mechanism. In one embodiment, the deployment line is retrieved at the back deck of a marine vessel. At block 1204, the method includes positioning a node detachment machine proximate to the deployment line (which may also be used as a node attachment machine). At block 1206, the method includes detecting a node on the deployment line. In one embodiment, such node detection is performed by the node detachment machine, such as by one or more forks that are configured to detect a ferrule coupled to the cable (thereby indicating the position of the node). At block 1208, the method includes accelerating the node detachment machine to a speed that is approximately that of the deployment cable. In other embodiments, the deployment line is slowed and/or stopped prior to node detachment. At block 1210, the method includes detaching a node from the deployment line by using a node detachment machine. In one embodiment, the detaching machine may or may not be the same machine used to couple the nodes to the deployment line. For example, the vessel may contain separate coupling and decoupling machines. In some embodiments, automatically detaching the seismic node may include actuating a portion of the direct attachment mechanism and/or locking mechanism by a detachment tool for releasing the deployment line from the node locks. The detachment tool may be integrated with the decoupling system or be a separate component that can be used manually or semi-automatically. In some embodiments, the detachment tool also operates as the attachment tool. In other embodiments, the deployment line is pulled by force from the node locks to disengage the deployment line from the node, such as by node remover 530. As shown in block 1212, once the node has been removed and/or decoupled from the deployment line, the detached node is positioned away from the deployment line and transferred out of the retrieval line path so that the detachment machine is then in a ready position to accept another node to decouple from the deployment line. This process is repeated until the desired number of seismic nodes is detached from the deployment line. In one embodiment, each of these steps is performed automatically, while in other embodiments the detecting, positioning, and/or detaching steps may be performed by manual or semi-automatic methods The rate of retrieval can be varied and/or stopped as needed and is controlled by a master control system that is integrated with the primary components of the node deployment system and node installation system.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

What is claimed is:

1. A method of attaching a plurality of seismic nodes to a deployment line, comprising:
    positioning a plurality of seismic nodes next to a deployment line being deployed from a marine vessel; and
    attaching the plurality of seismic nodes to the deployment line by coupling a portion of the deployment line to at least one direct attachment mechanism on each of the plurality of seismic nodes.

2. The method of claim 1, wherein the attaching step comprises automatically coupling the at least one direct attachment mechanism to the deployment line by using a node attachment machine.

3. The method of claim 1, wherein the attaching step comprises automatically detecting a node placement position on the deployment line.

4. The method of claim 1, wherein the attaching step comprises moving the at least one direct attachment mechanism from a closed position to an open position.

5. The method of claim 1, wherein the attaching step comprises unlocking the at least one direct attachment mechanism by contact with the deployment line.

6. The method of claim 1, wherein the attaching step comprises locking the at least one direct attachment mechanism onto the deployment line.

7. The method of claim 1, wherein the attaching step comprises inserting the deployment line into the at least one direct attachment mechanism.

8. A method for deploying a plurality of seismic nodes into a body of water, the method comprising:
    deploying a deployment line into a body of water from a marine vessel; and
    attaching a plurality of seismic nodes to the deployment line during deployment,
        wherein each of the plurality of seismic nodes is attached to the deployment line by inserting the deployment line into at least one locking device located on each of the plurality of seismic nodes.

9. The method of claim 8, further comprising actuating the at least one locking device to an open position.

10. The method of claim 9, wherein the actuating step comprises pushing the at least one locking device line into an open position.

11. The method of claim 9, wherein the actuating step comprises positioning the deployment line into the at least one locking device.

12. The method of claim 9, wherein the actuating step comprises using an attachment tool for moving the at least one locking device to an open position.

13. The method of claim 8, further comprising returning the at least one locking device to a locked position after insertion of the deployment line.

14. The method of claim 8, further comprising actuating the at least one locking device into a locked position after coupling the deployment line with the at least one locking device.

15. The method of claim 8, further comprising automatically returning the at least one locking device to a locked position after insertion of the deployment line into the at least one locking device.

16. A method for retrieving a plurality of seismic nodes attached to a deployment line from a body of water, the method comprising:

retrieving a deployment line onto a marine vessel from a body of water, wherein a plurality of seismic nodes is directly attached to the deployment line by at least one locking device located on each of the plurality of seismic nodes; and detaching each of the plurality of seismic nodes from the deployment line after being retrieved on the marine vessel by actuating the at least one locking device to an open position, and positioning the deployment line away from the at least one locking device.

17. The method of claim 16, wherein the actuating step comprises pushing the at least one locking device line into an open position.

18. The method of claim 16, wherein the positioning step automatically moves the at least one locking device into a closed position.

19. The method of claim 16, wherein the positioning step comprises moving the deployment line out of the at least one locking device.

20. The method of claim 16, wherein the positioning step comprises moving the at least one locking device away from the deployment line.

* * * * *